(12) United States Patent
Jacobson et al.

(10) Patent No.: US 9,092,317 B2
(45) Date of Patent: Jul. 28, 2015

(54) ALGEBRAIC DEVICE AND METHODS OF USE THEREOF

(76) Inventors: Dov Jacobson, Berkeley Lake, GA (US);
Jesse Jacobson, Atlanta, GA (US);
Tatiana Krivosheev, Suwanee, GA (US)

(*) Notice: Subject to any disclaimer, the term of this patent is extended or adjusted under 35 U.S.C. 154(b) by 606 days.

(21) Appl. No.: 12/912,560

(22) Filed: Oct. 26, 2010

(65) Prior Publication Data

US 2011/0131261 A1    Jun. 2, 2011

Related U.S. Application Data

(60) Provisional application No. 61/254,953, filed on Oct. 26, 2009.

(51) Int. Cl.
*G06F 15/02* (2006.01)

(52) U.S. Cl.
CPC .................................. *G06F 15/0225* (2013.01)

(58) Field of Classification Search
None
See application file for complete search history.

(56) References Cited

U.S. PATENT DOCUMENTS

| | | | |
|---|---|---|---|
| 2003/0088596 A1* | 5/2003 | Child et al. ................... | 708/162 |
| 2004/0054701 A1* | 3/2004 | Garst ............................ | 708/131 |
| 2004/0068528 A1* | 4/2004 | Erickson ....................... | 708/160 |
| 2005/0058976 A1* | 3/2005 | Vernon ......................... | 434/322 |
| 2005/0108306 A1* | 5/2005 | Martizano Catalasan .... | 708/160 |
| 2008/0104153 A1* | 5/2008 | Hatch ........................... | 708/142 |
| 2011/0131261 A1* | 6/2011 | Jacobson et al. ............. | 708/131 |
| 2012/0107779 A1* | 5/2012 | Halton et al. ................. | 434/188 |
| 2012/0141960 A1* | 6/2012 | Khalsa et al. ................. | 434/188 |

* cited by examiner

*Primary Examiner* — David H Malzahn

(57) ABSTRACT

This invention provides a novel affordance to algebra. It combines the immediacy of a manipulative with the power of a computer algebra system. Operations are executed in-place on a mutable expression, by direct manipulation of its terms by the user.
Terms, whether simple or complex, can be selected by the user and dragged from one location in the expression to another. The equivalence of the expression is maintained by changes to the moving term and other terms in the expression. A highly interactive interface illuminates to the user the range of potential actions.
The beneficiaries of this technology are students, who have a new avenue for exploratory learning and technologists, who have a new tool for symbolic reasoning.

14 Claims, 38 Drawing Sheets

$$Y = mX + b$$ *Start*

$$Y = Xm + b$$

$$Y = b+mX$$ *End*

FIG. 15

$$\frac{d(x^3)}{dx}$$

*Start*

$$3x^2$$

*End*

*FIG. 24*

$$\frac{d(x^3)}{dx} \quad \text{Start}$$

$$\frac{x\,d(x^2) + x^2\,dx}{dx} \quad \text{End}$$

*Start*

$$\frac{Y}{X} = m + \frac{b}{X}$$

*End*

*FIG. 31* embodiment, this representation is used by the computer algebra system, internally and in communication with other components.

ALGEBRAIC DEVICE AND METHODS OF USE THEREOF

CROSS-REFERENCE TO RELATED APPLICATION

The present application claims priority to and benefit of the prior filed co-pending and commonly owned provisional application, filed in the United States Patent and Trademark Office on Oct. 26, 2009, Application No. 61/254,953 entitled Algebraic Device and Methods of Use Thereof and incorporated herein by reference.

Note that certain terms are defined differently in the two documents. In such cases the scope of the definition is limited to the document in which it appears.

FEDERALLY SPONSORED RESEARCH AND DEVELOPMENT

This invention was supported in part by the United States Defense Advanced Research Projects Agency W31P4Q-08-C-0162. The Government has certain rights in the invention.

FIELD OF INVENTION

Our invention relates to a device and method with which a user may perform validated algebraic operations. The primary field of application of the invention may be as a device for mathematics education (434/188). The invention may also be applied to algebraic exercises in fields other than mathematics.

The invention may be used as a working interface of a basic computer algebra system. As such, our invention may be used as a computational device for practical problem-solving. This indicates several fields of art, perhaps fitting best in (708/100/ 160/171) Electrical Digital Computer with Special Symbolic Output.

BACKGROUND

Two fundamentally different approaches to education compete for acceptance. The first features the direct transfer of knowledge from master to student—using lecture, reading or demonstration. In the second, the student is guided in an exploratory process during which knowledge is personally discovered. The second method, advocated by Socrates, Maria Montessori and most graduate school programs, claims to achieve deeper understanding and higher retention. But its success depends on the creativity and energy of teachers as they guide individual students. In order to reduce this demand, many tools have been developed to promote the students' discovery of knowledge.

Mathematics education has a history of exploratory learning. A progression of manipulative devices have transformed mathematical abstractions into arrangements of concrete objects made of wood, bone, metal or polymer. Some of these illustrate the properties of numbers, others allow the student to explore operations. Some manipulatives (such as the abacus and the slide rule) demonstrate utility beyond learning and enter the everyday toolbox of those who work with numbers.

Among the aspirations of the present invention is to combine the proven educational value of a math manipulative with the logic engine of a computer algebra systems. These may form a virtual manipulative in which displayed symbols emulate the physicality of material tokens while obeying formal rules.

The roots of the present invention predate the digital computer and the modern patent system. Manipulative devices have been developed to aid math learning and performance since civilization made calculation necessary.

Four millenia ago, the abacus appears. Variations in design support calculation in cultures that use base 60 (Sumerian), base 20 (Aztec) as well as the ubiquitous base 10 number systems. The abacus is a powerful tool for arithmetic processing, but it does little to support symbolic thinking.

An alternative to the abacus was the ancient Chinese system of counting rods. In the 16th century, when the abacus finally displaced them, counting rods were adapted by Japanese algebrist Seki Takakazi as physical tokens that served to introduce his system of symbolic manipulation within the isolated mathematic tradition of wasan.

The slide rule, invented in 18th century Europe, is a familiar manipulative. Unlike the abacus, with its discrete states, the slide rule is an analog computer. It was used for calculation until replaced by the electronic digital calculator in the late 20th century. Although it had a place in schools, the slide rule was principally used for practical engineering. The slide rule offers its user power over numbers, even irrational numbers—but not abstract symbols.

In the twentieth century, classroom manipulatives were developed specifically to expose young children to basic arithmetic and the properties of the base 10 numbers. Most fundamental of these are Cuisenaire rods (1952), colored rods with integer lengths which introduce arithmetic, fractions, and squares.

Sellon (U.S. Pat. No. 4,445,865, 1984) improves the Cuisenaire system to better teach base 10 multiplication. Patents for similar grid-like games, based on familiar multiplication tables, stretch back to Verneau (U.S. Pat. No. 381,829.1922).

Rainey (1998) teaches a device for manipulating base 10 numbers. Such manipulatives teach concrete number relationships—but do not help students learn symbolic thinking.

Not all manipulatives involve rods or grids: Lewis (1926) teaches a reconfigurable roulette apparatus for educational games. While it can be applied to mathematics, it assists only in rote memorization and simple drills.

More relevantly, Donecker (1905) produces a tool for learning algebra. Using a system of balance beams and pans, it builds a physical analog for certain linear equations. The device illustrates the laws of proportionality, and provides a concrete sense of the unknown variable. However it offers no insight into symbolic reasoning.

Harder (1980) presents a four-player game of competitive algebraic solution. His board game allows learners to share the experience of solving an equation. Equations (and inequalities) are presented on wooden strips. Using familiar wooden tiles, the players take turns solving the equations. The board rotates 90 degrees at each turn, with each player validating the work of the previous player. Points are scored for correct operations and solving equations.

The Harder game provides limited exercise in symbolic manipulation, but does so without the benefit of technology.

The introduction of the electronic digital computer allows the evolution of logical systems not limited to manipulation of numbers. Symbolic logic is an early concern of computer scientists. An application providing this capability is called a Computer Algebra System (CAS).

The seminal CAS programs predate the patentability of software. Among these are Macsyma, begun in 1968 at MIT, and released commercially in 1982. At CalTech, SMP and Schoonschip (1963) were the antecedents of the commercially successful program Mathematica (1988, Wolfram) which shares market domination with Maple (1980, University of Waterloo).

Like most CAS packages, Maple and Mathematica are solvers—not teaching programs. They do not demonstrate the internal steps required to go from problem to solution.

Handheld calculators have been marketed which include Computer Algebra Systems. Prominent among these is the TI-NSpire CAS (2006) which has an embedded version of Derive (1988), a small-footprint CAS written, like many algebraic solvers, in a form of LISP.

The prior art includes several examples of interfaces built on top of Computer Algebra Systems with the intent of providing a learning experience.

Certain packages, such as the Algebrator (SoftMath, 1990?) explicitly show every step of the transition, and provide textual explanation of each of these steps. This is meant to educate the student, but it offers no exploratory pathways. Marketed to students as an automated tutor, it could also be abused as a homework robot.

Bonadio (1993) teaches a Computer Algebra System in which a graphic user interface (GUI) allows users to enter commands. Bonadio's system, known variously as Theorist, MathView and LiveMath employs a GUI to direct the CAS to derive a new expression from the existing expression, and to display the new one below the old one. A sequence of expressions cascade down the screen. By displaying line after line of expressions, in the manner of a console-driven application, the software does not behave like a manipulative device. Further, Bonadio's device offers no algebraic response to the user's actions until the user had completely specified the operation.

Addressing a different market, Razdow (1994) introduces the concept of a "live" symbolic expression. Using his software, MathSoft 3.1, a user can manipulate an expression in a document and rely on the editor's symbolic algebra engine to alter other expressions so that they remain true. This invention can be seen as combining the 'live' nature of a spreadsheet with the graphic sophistication of an equation compositor. The goal is exposition, not education. The actual solutions that MathSoft performs go little beyond altering the initial assignments in a system of equations and performing the consequent substitutions.

Vernon (application 2004) demonstrates concern for the learning process, and introduces an interactive experience that monitors student performance. Given an expression, the student types in a line of text which represents the new expression after applying an algebraic operation, as a single step toward the solution. The software analyzes both initial and subsequent statements, and searches a rulebook to determine the validity of the student's work. Errors, of course, are flagged. The steps are repeated until the solution is arrived at.

Vernon's technological claims, which—like most CAS engines—focus on the nodal structure of expressions, are interesting in that they amount to a sophisticated equivalent of the "diff" program: they compare two expressions and remove the equivalences. The remaining elements are subjected to a search through a rulebook database.

Vernon's invention compels the student to iteratively enter ASCII text strings with incremental changes to the statement—rather than directly moving the terms of a classical math representation.

It only tests the validity of work after it is performed, rather than supporting the exploratory learner with hints, previews and suggestions.

PRIOR ART

U.S. Pat. No. 784,145 March, 1905
An Algebraic Balance
F. C. Donecker
U.S. Pat. No. 1,403,989 Jan. 17, 1922
Arithmetical Game
Henry Verneau, St. Louis, Mo.
U.S. Pat. No. 1,635,735 Jul. 12, 1927
Educational Game
George W. Ziegler, Long Beach, Calif.
U.S. Pat. No. 4,445,865 May 1, 1984
Method Of Teaching Mathematics
Jeffrey Sellon, Pound Ridge, N.Y.
U.S. Pat. No. 4,316,612 Feb. 23, 1982
Educational Algebra Board Game
Kenneth J. Harder, Bay St. Louis, Miss.
U.S. Pat. No. 5,189,633 Feb. 23, 1993
Apparatus and method for interactively manipulating mathematical equations
Allan R. Bonadio, Mill Valley, Calif.
U.S. Pat. No. 5,469,538 Nov. 21, 1995
Mathematical Document Editor And Method Performing Live Symbolic Calculations For Use With An Electronic Book.
Allen M. Razdow, Cambridge, Mass.
PCT/NZ97/00082 Dec. 23, 1998
(U.S. Pat. No. 6,413,099 Jul. 2, 2002)
Educational Device For Teaching Simple And Complex Mathematical Concepts
John D. Rainey, Auckland, New Zealand
US 2005/0058976 (Application Publication) Mar. 17, 2005
Program For Teaching Algebra
David H. Vernon, Dallas, Tex.

SUMMARY

Our invention relates to a tool for manipulating the terms of an algebraic expression. This device is a computational engine which performs the logical manipulation of symbols as permitted by algebraic rules, with a corresponding display system that exposes representations of these symbols to the user, and a corresponding input system which registers the user's signals of intent.

Advantageously, our invention supports the study and practice of algebraic reasoning with a user experience which is more direct, transparent and facile than any alternative—particularly keyboard entry or pencil and paper methods.

Our invention emulates the physicality of a manipulative device by presenting movable symbols whose behaviors respond to user input even as they reflect the logic of an embedded computer algebra system.

Users perform operations by directly moving terms within a displayed expression while the system alters these terms and/or the remainder of the mutable expression to preserve its validity, consistent with the transformations permitted by the algebra.

Our invention can optionally supply real-time previews indicating which term(s) can be selected, where each can be placed, and which alterations would be performed, if the placement were executed, on the moved term(s) and on the rest of the expression.

Our invention parses the significance of terms in the context from which they are selected and their new significance at each of the various loci where they may be validly placed. When relevant, user intent can be disambiguated by one or more of several information sources which include the path travelled by the moving term, simultaneous movements of other terms, or orthogonal user input. By processing these significances, the invention can compose an expression that conforms to both algebraic rules and user intent.

Our invention optionally offers the unique benefit of recording every step, whether deliberate or tentative, considered by a student. Analysis of the student's process will identify failure points to be remediated by a human teacher, automated mentoring software—or by self-help.

Our invention optionally adapts to the limits and the strengths of various input technologies, such as: Keyboard, Gamepad, Mouse, Touch, Multi-touch, Gesture. Each technology suggests different modalities of selection, drag and release and each presents different feedback opportunity.

Several important features of our invention has been summarized above. Many more are possible; our invention is not to be limited to these examples. Other features and advantages of the inventions may be more clearly understood and appreciated from a review of the following detailed description and by reference to the appended drawings and claims.

BRIEF DESCRIPTION OF THE DRAWINGS

All of the drawings display illustrative embodiments of the invention. Other embodiments may be possible.

Figure 15:
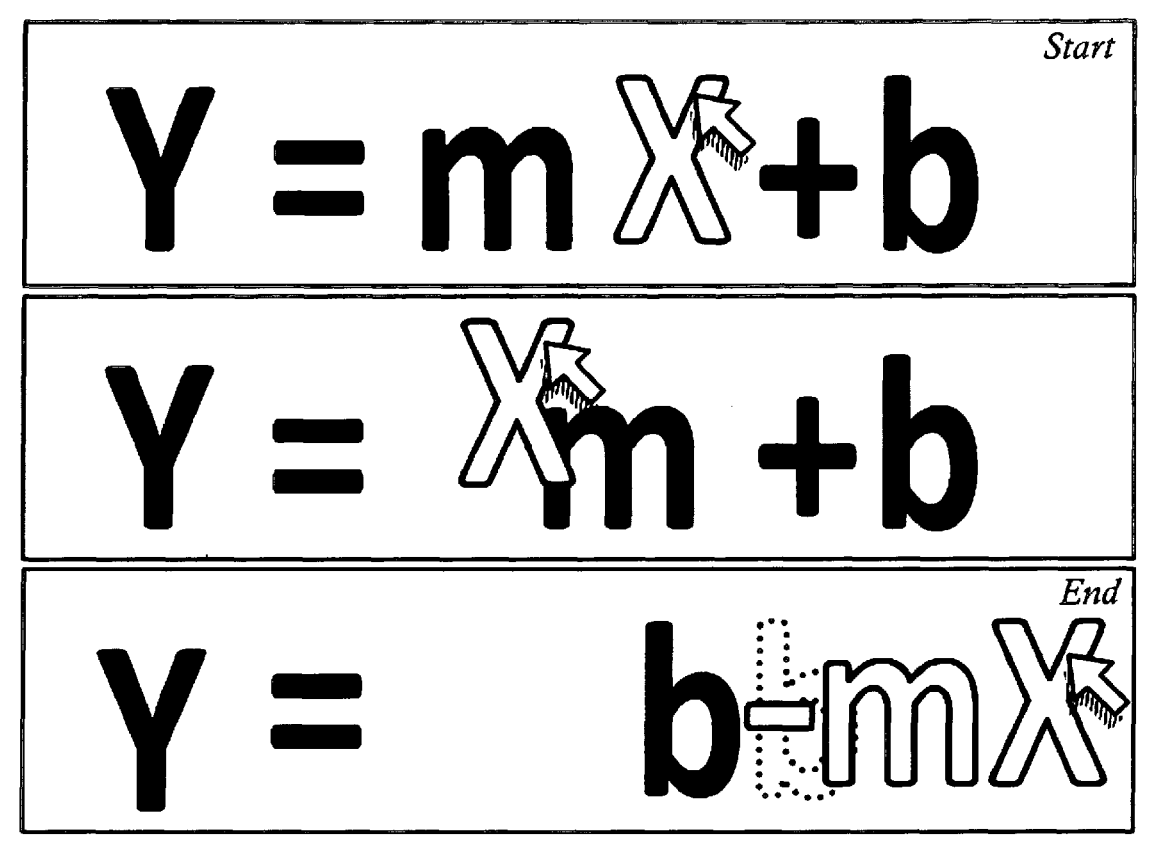

FIG. 15 shows the selection of a multiplicand term (122), its behavior as a multiplicand, and its promotion to a compound addend (121) as it enters region (119)(FIG. 14).

FIG. 24 shows the application to calculus. In this illustration, the compound operand ×3 (129) is selected.

FIG. 25 shows the same starting expression as FIG. 24, but in this case, the simple operand x (130) is selected, with much different results.

FIG. 31 is a simple use of a multi-touch interface. In this case the gesture is used to explicitly override term promotion.

SPECIFICATION

Figure 1:
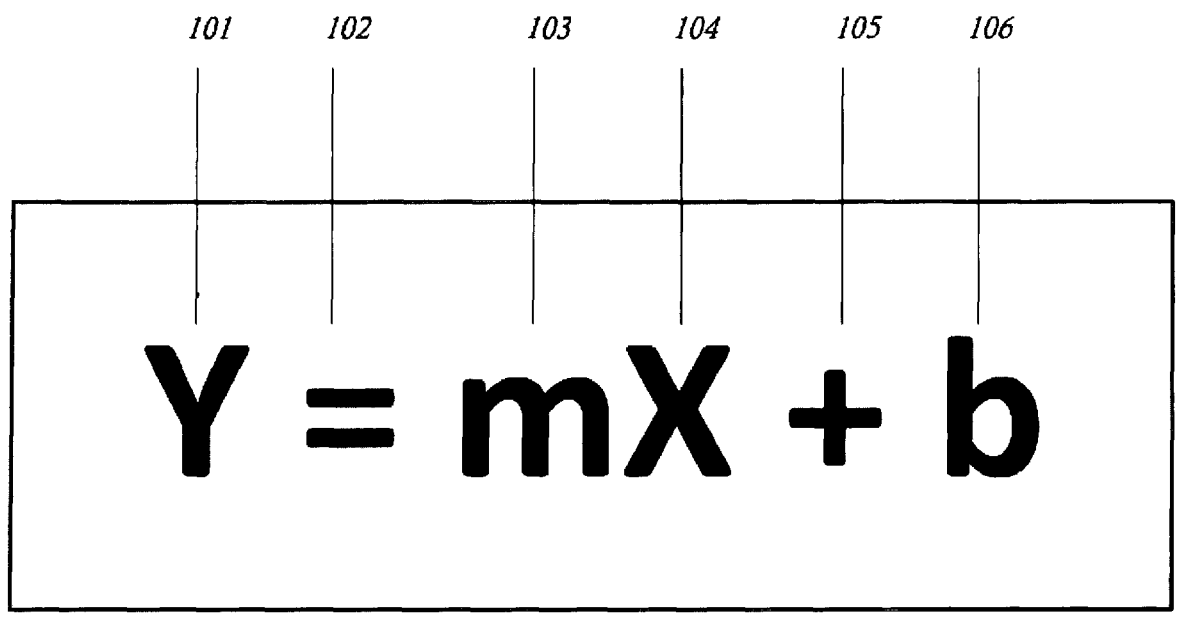
FIG. 1 shows several operands (101, 103, 104, 106) and operators (102, 105) present in a simple equation.

The invention is described by reference to exemplary embodiments including devices and methods. The invention, however, should not be limited to these embodiments, but may also cover other devices and methods (not specifically described) in accordance with the invention.

Our invention relates to a computational system including a device, and methods of use thereof, that enables the orderly and facile manipulation of one or more symbolic expressions.

DEFINITIONS

Algebra is a self-consistent rule set for the meaning of certain symbols and the relationships between them.

Algebraic Device is one which performs symbolic operations in compliance with a formal algebra.

Operand is a symbolic representation of a known or unknown value, quantity, entity or concept in the algebra.

Operator is a representation of a process by which one or more operands can be composed into compound operands.

Statement is a compound operand whose value is true

Expression is any operand, statement, or system of statements meaningful in the algebra.

Term is a simple or compound operand, whose relationship to the expression is determined by its original locus.

Locus identifies a valid position of a term within an expression, signifying both the graphical representation and its corresponding logical relationship.

Target Area is the graphic zone representing a locus.

Region is an area containing one or more loci within which the context of a moving term remains consistent. (Changes in context are generally resolved by changes in the moving term, including promotion or inversion.)

In-place transformations are those in which new values replace old values in the same representation, so that users perceive a persistent, mutable expression.

Mathematical operators generally include arithmetic, exponential, trigonometric, logarithmic, differential, integral and many other classes of operators. Operators may be represented in any of several accepted forms of notation, some of which vary by domain and context. For example, while addition is almost universally represented by a+b, exponentiation might be shown as $Y^X$, Y**X, Y^X or pow(y,x). Conversely, Y^X indicates an exclusive—or operator in other domains. Note that while operators are generally represented explicitly by a symbol, some notations imply a certain operator simply by the graphic relationship of proximate operand symbols. For example, 2X is generally recognized as 2 multiplied by X; while $2^X$ is recognized as 2 raised to the $X^{th}$ power.

A operand manipulated in this device may be a symbol which represents a value, known or unknown. For example, simple operands are X or $\theta_t$ or 7. A compound operand may be one or more operands combined one or more operators. Examples of compound operands may include: $-2$ or $\sin \theta$ or mX or mX+b or $\pi r^2$. Composited operands such as $t_0$ are accessed by the combined meaning of multiple symbols.

EXEMPLARY EMBODIMENT

An exemplary embodiment of the invention may comprise: A computer system comprising processor, memory features, communication feature, display device, input device, and appropriate software, which system may have been configured to perform one or more of the following actions, steps or sequence:

(1) The output device may present one or more expressions to the user. (FIG. 1) The expression(s) may be chosen by the user or presented to the user as a challenge. The expression(s) can originate from any of a multitude of sources, including, but not limited to user composition, user manipulation of existing expression(s), retrieval from a memory feature of the device, receipt from external source via a communication feature of the device, or a combination of any of the above sources. It may be the result of the shared efforts of collaborating users. The expression(s) may be revised or augmented during use from any of this multitude of sources.

Figure 2:
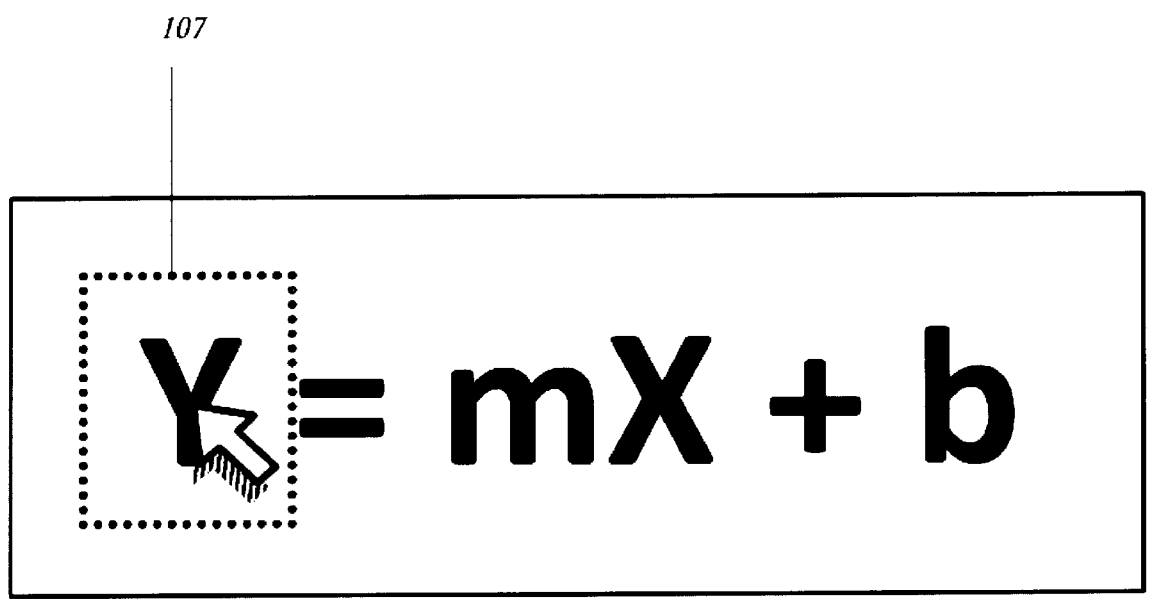
FIG. 2 shows a simple operand (107) whose rollover response to the cursor shows it may be selected as a movable term.
Figure 3:
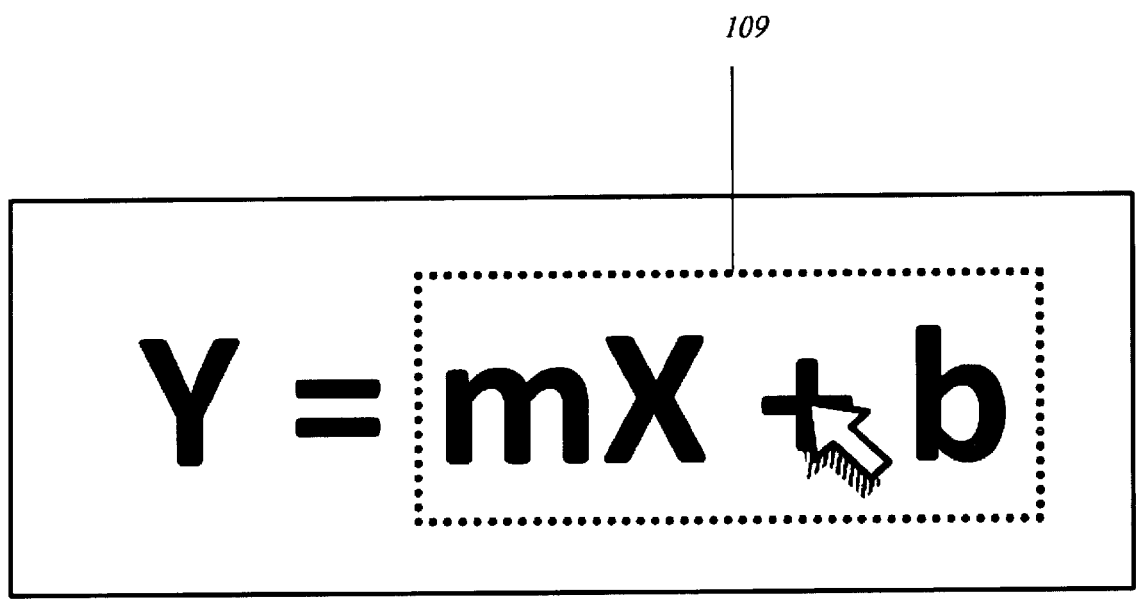
FIG. 3 shows the selectability of a compound operand (109).
Figure 4:
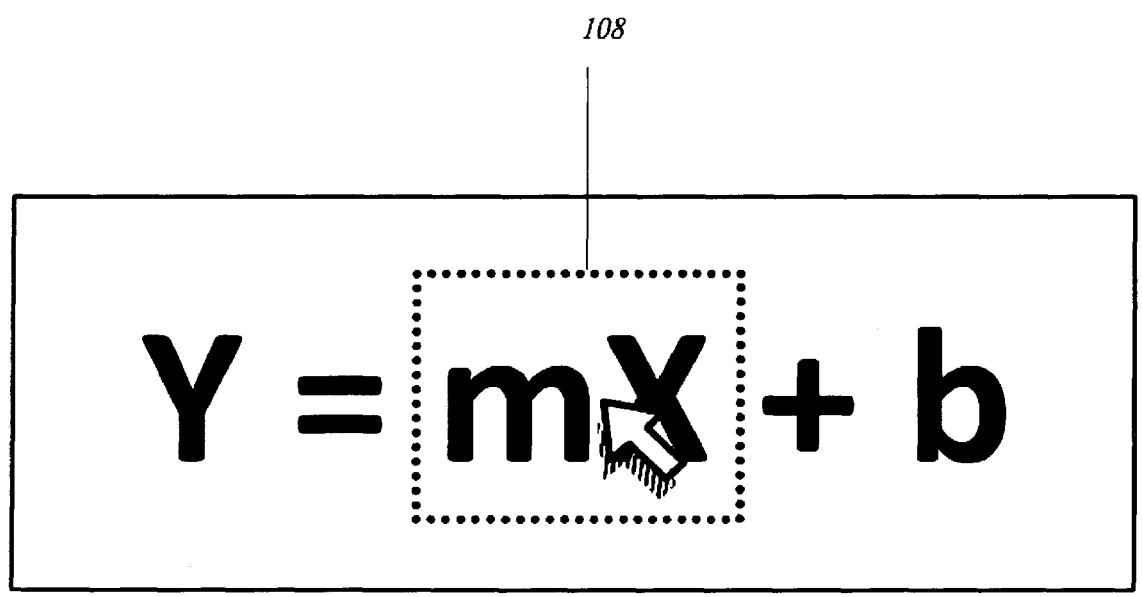
FIG. 4 shows a compound operand (108) which is a constituent of the compound operand (109). This selectable term is an addend.
Figure 5:
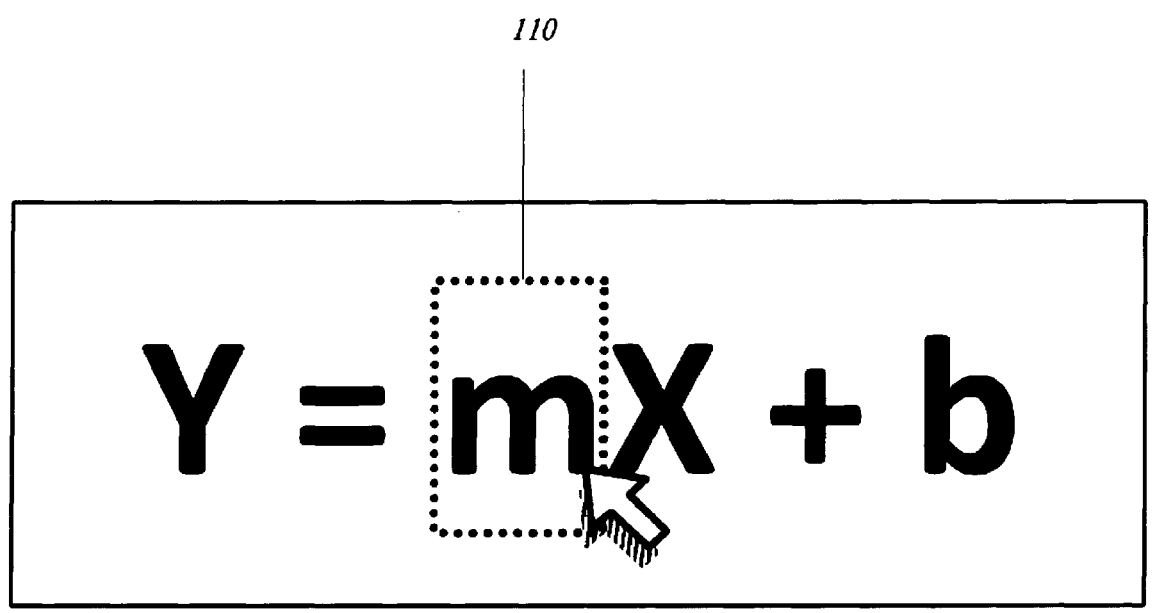
FIG. 5 shows the selectability of a simple operand (110) nested within the compound operand (109). This term is a multiplicand.
Figure 6:
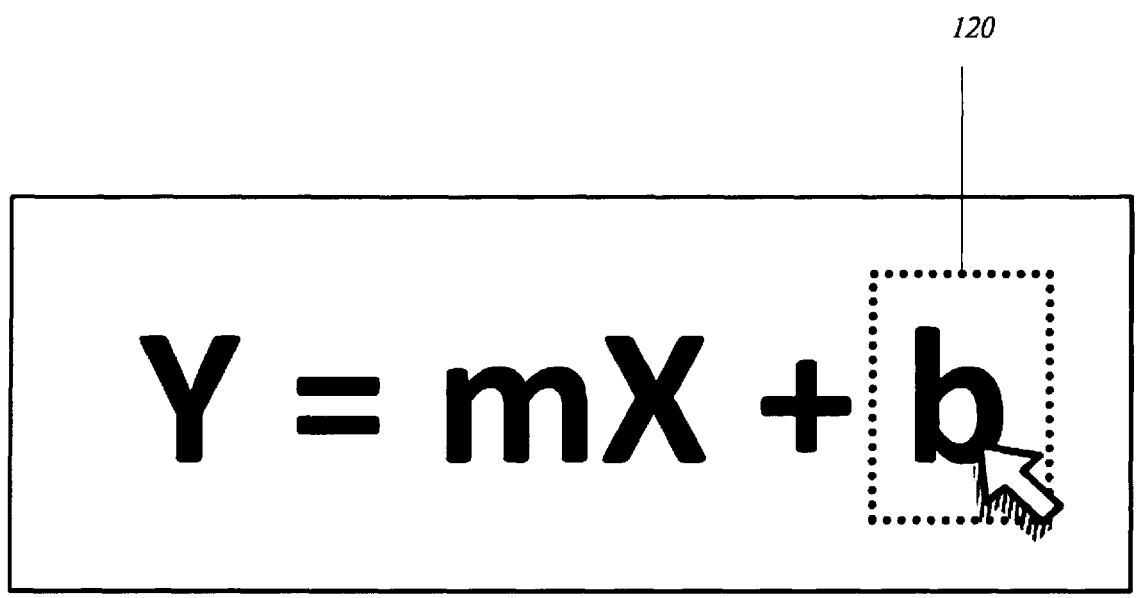
FIG. 6 shows the selectability of the final simple operand (120).
Figure 7:
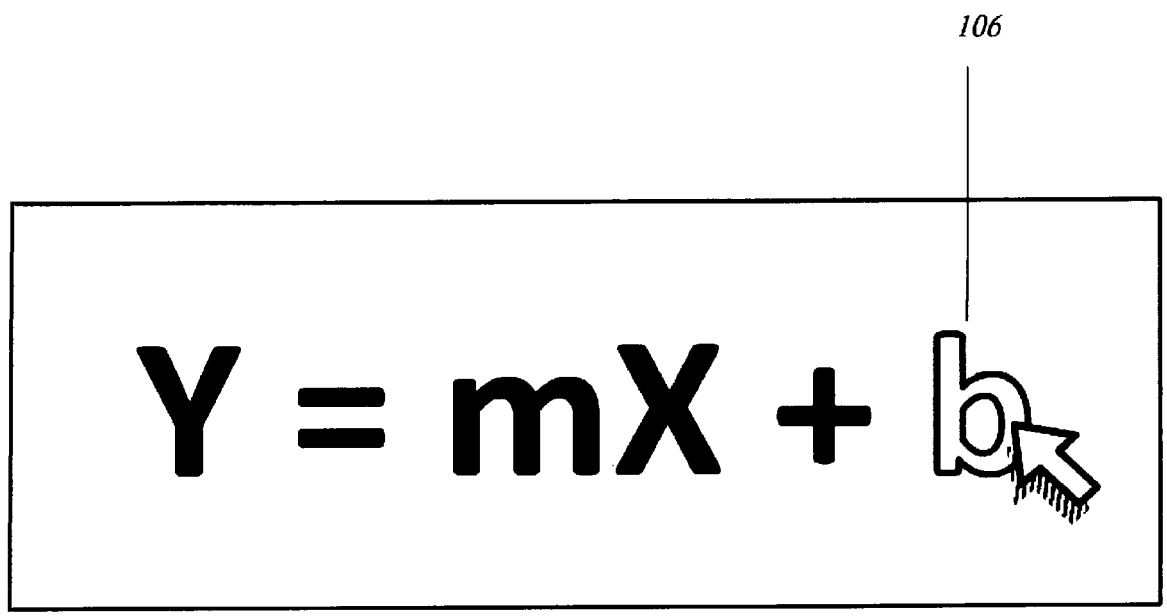
FIG. 7a shows the selection of the final term (106).
FIG. 7b shows an alternate visual representation of the selected term (106), which includes the addition operator to emphasize that the term is an addend.
Figure 7A:
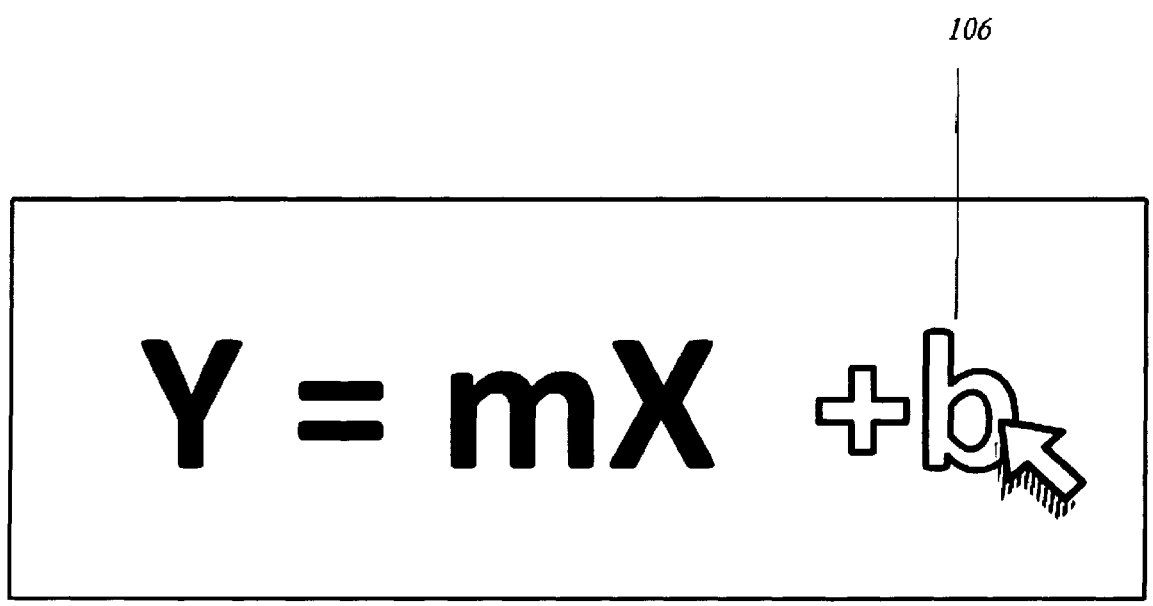

(2) Using the input device, the user may select a term. (FIG. 7a, 7b) The selectability of the term and its extent may be indicated by its response to the approach of a cursor or pointer (FIG. 2, 3, 4, 5, 6).

Figure 8:
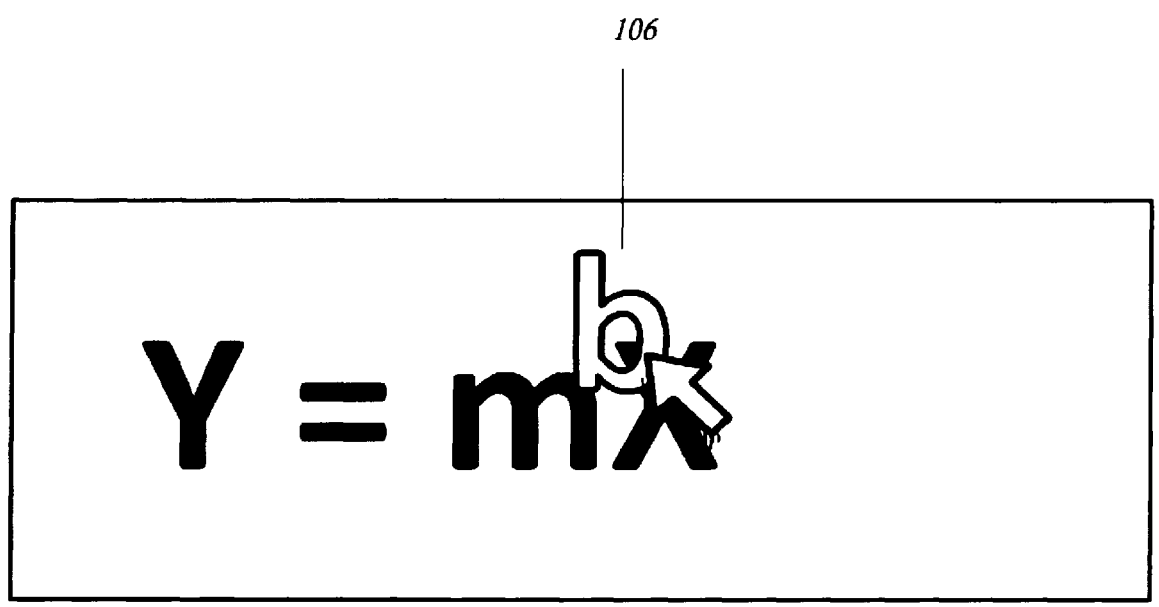
FIG. 8 indicates user-directed movement of the selected term (106).
Figure 9:
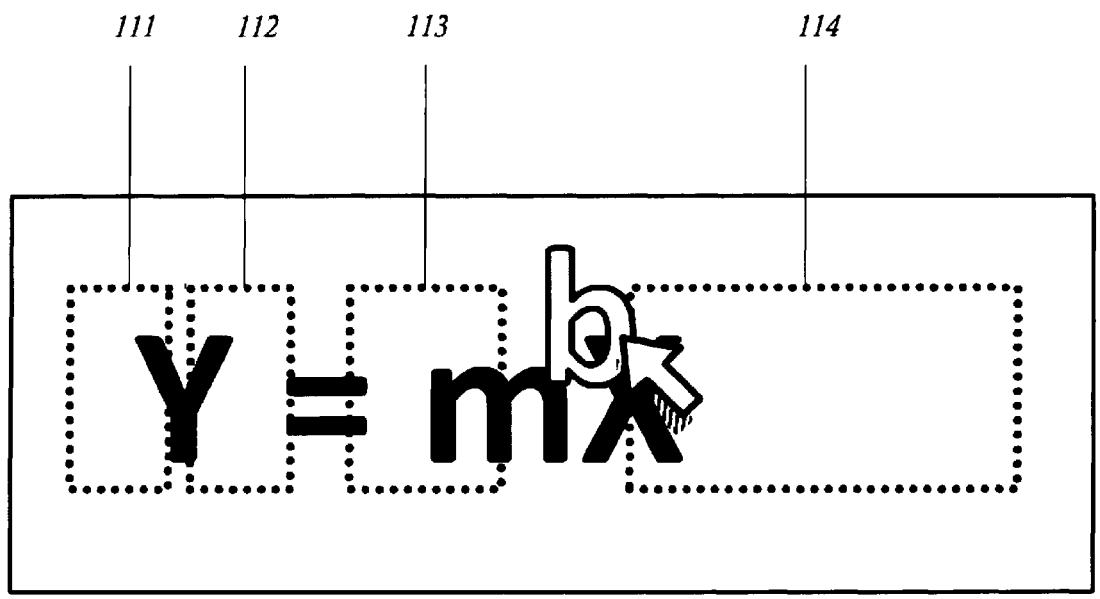
FIG. 9 shows the target areas (111, 112, 113, 114) around each of four loci.

(3) Continuing, the user may move said term (FIG. 8) to another locus which suggests a well-formed expression. (FIG. 10) In this locus, the term's relationship to some or all of the remaining expression(s) may be altered. The availability of these meaningful loci might be indicated by a change in their appearance as the moving term enters the surrounding target areas. (FIG. 9)

Figure 10:
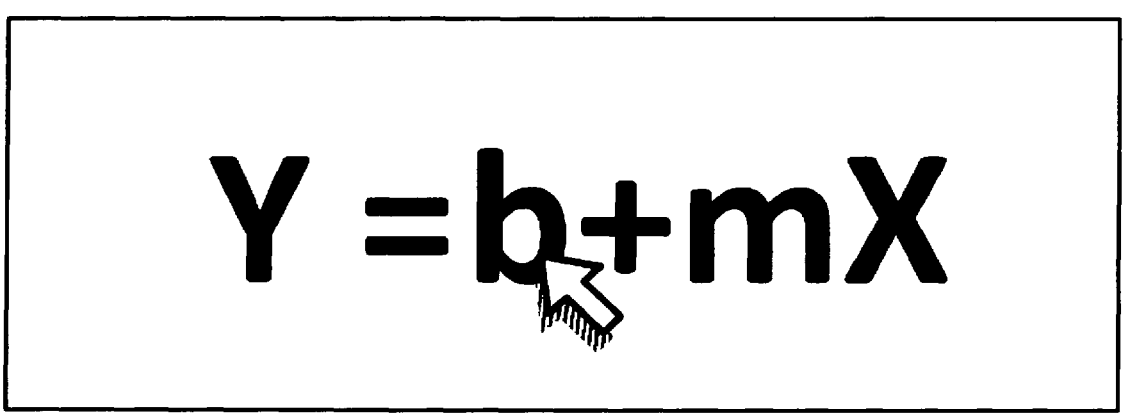
FIG. 10 shows the result after placement of the term in target area (113) (FIG. 9).

(4) In response to the symbol's arrival at a meaningful locus, the software may alter, add or remove one or more various operators to compose a well formed expression that maintains the truth of relationships in the expression, consistent with the rules of the current algebra, while reflecting the intent of the user. (FIG. 10, 12, 13, 1)

Figure 11:
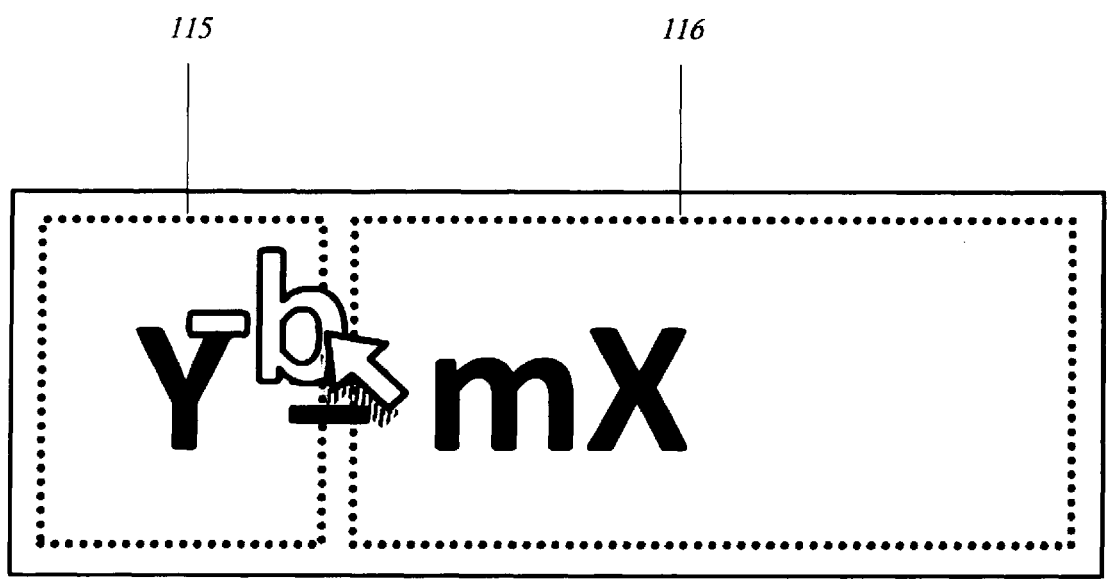
FIG. 11 shows the two regions (115, 116). Crossing from one region to the other will invert the sign of an addend.
Figure 12:
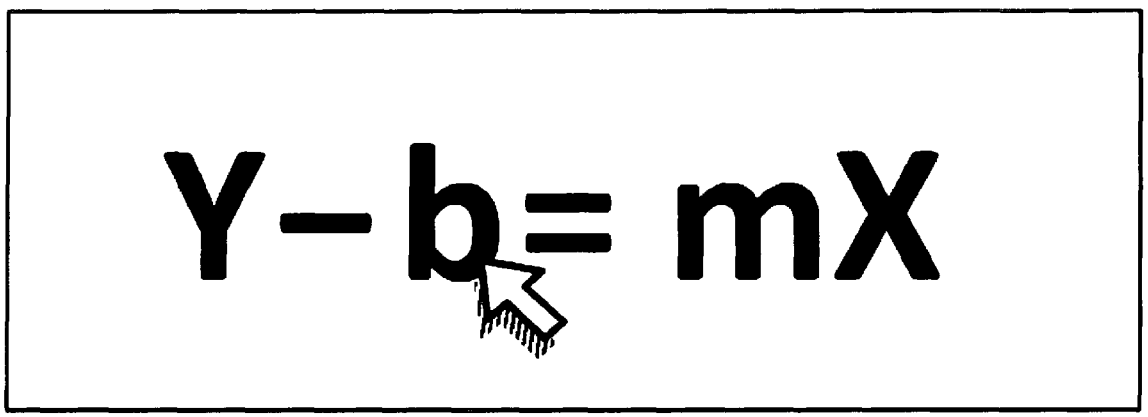
FIG. 12 shows the result after the term enters region (115) (FIG. 11) and is placed in target area (112)(FIG. 9).
Figure 13:
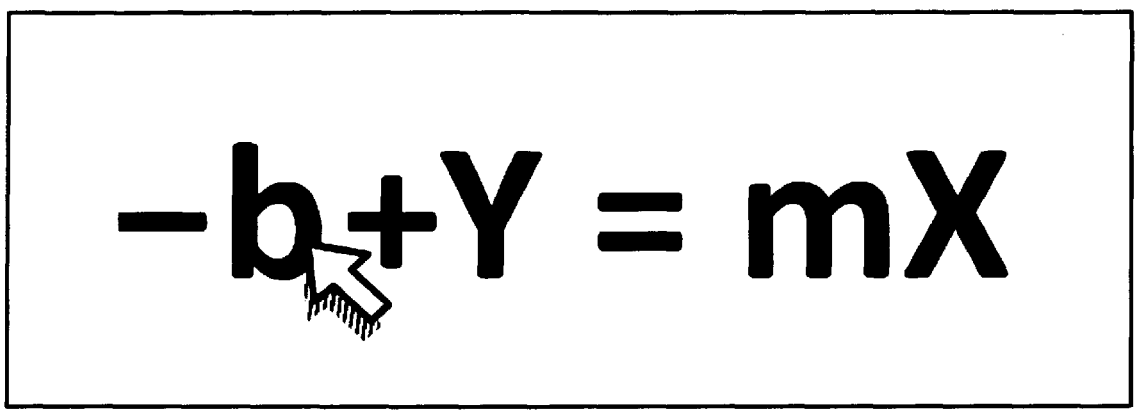
FIG. 13 shows the result of entering region (115)(FIG. 11) and target area (111)(FIG. 9).
Figure 14:
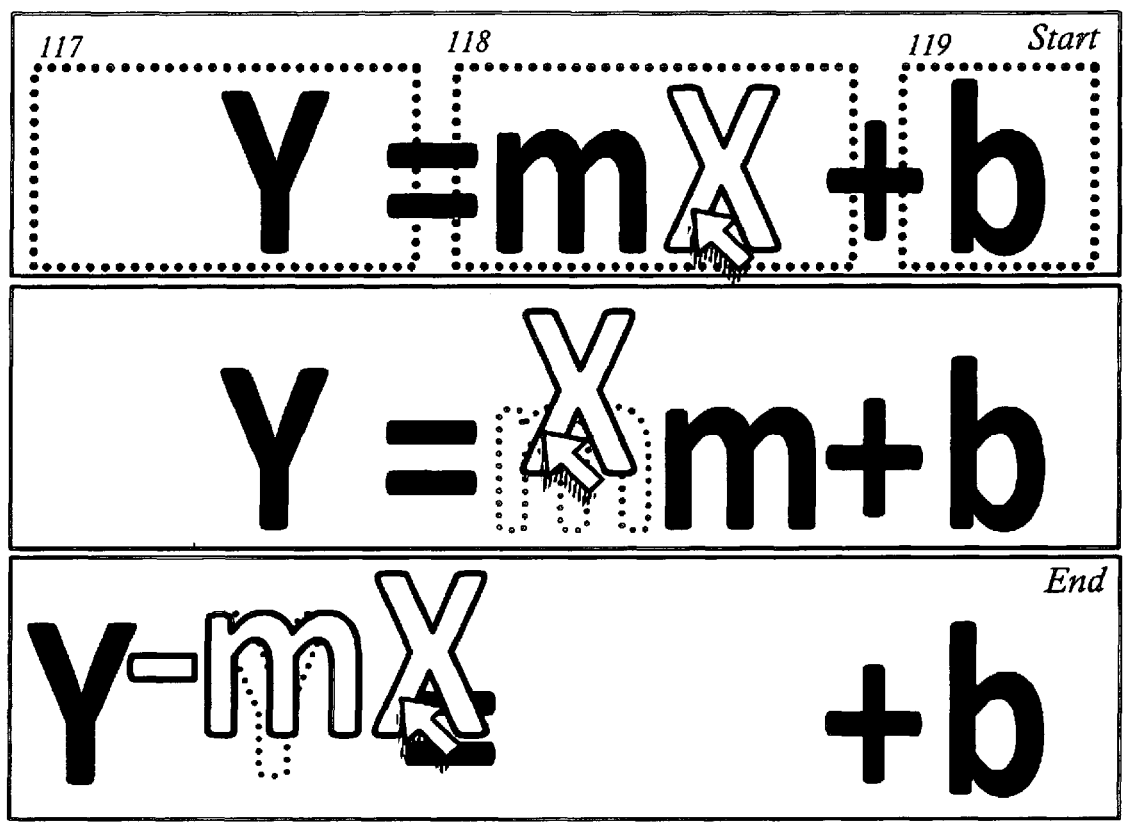
FIG. 14 shows the three regions (117, 118, 119) for the operand X (122) Within the region (118), the term X is a multiplicand, but entering (117) or (119) will (in some embodiments) promote the term into the addend mX (121).
Figure 16:
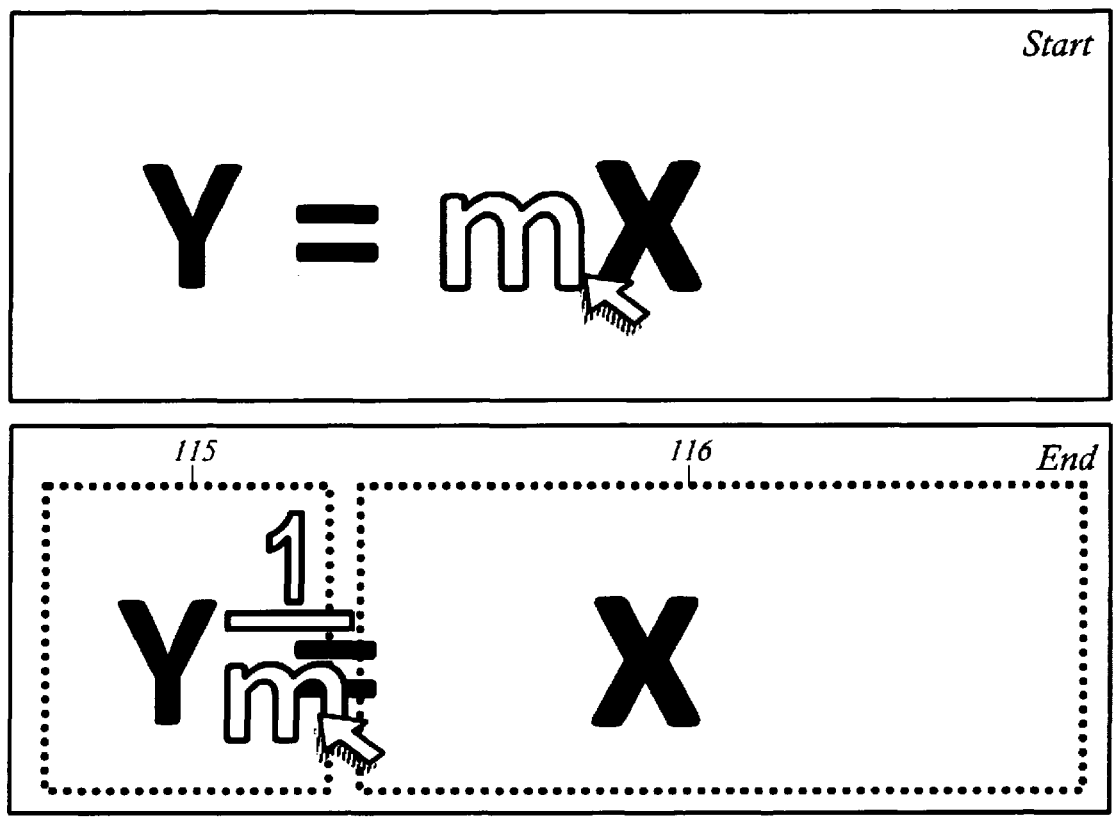
FIG. 16 shows the selection of the addend term (123) and the appearance of the two regions (115, 116). In the second phase, the term crosses into region (115) and becomes its reciprocal (124).
Figure 31:
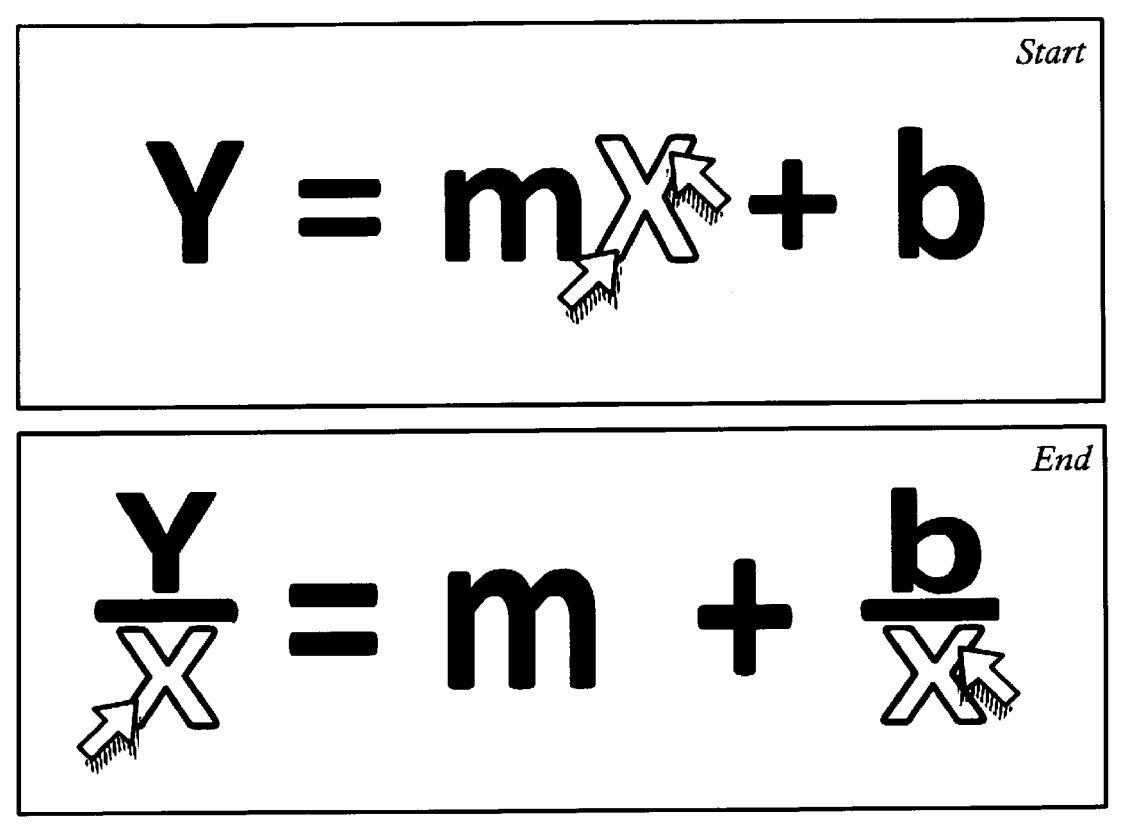

As it moves from one region to another, the moving term may transform to maintain algebraic integrity. Operands invert as they cross an equation: an addend negates (FIG. 11) and a multiplicand reciprocates (FIG. 16). Other regions (FIG. 14, 15) may require the moving term to promote to its parent (the compound operand of which it is part) and to revert as it leaves. Promotion can be suppressed by behavior rules (FIG. 17) or by interface techniques, such as multi-touch gesture (FIG. 31). Suppression simplifies movement of the term but complicates resolution of the operation. (FIG. 17(End)).

Figure 18:
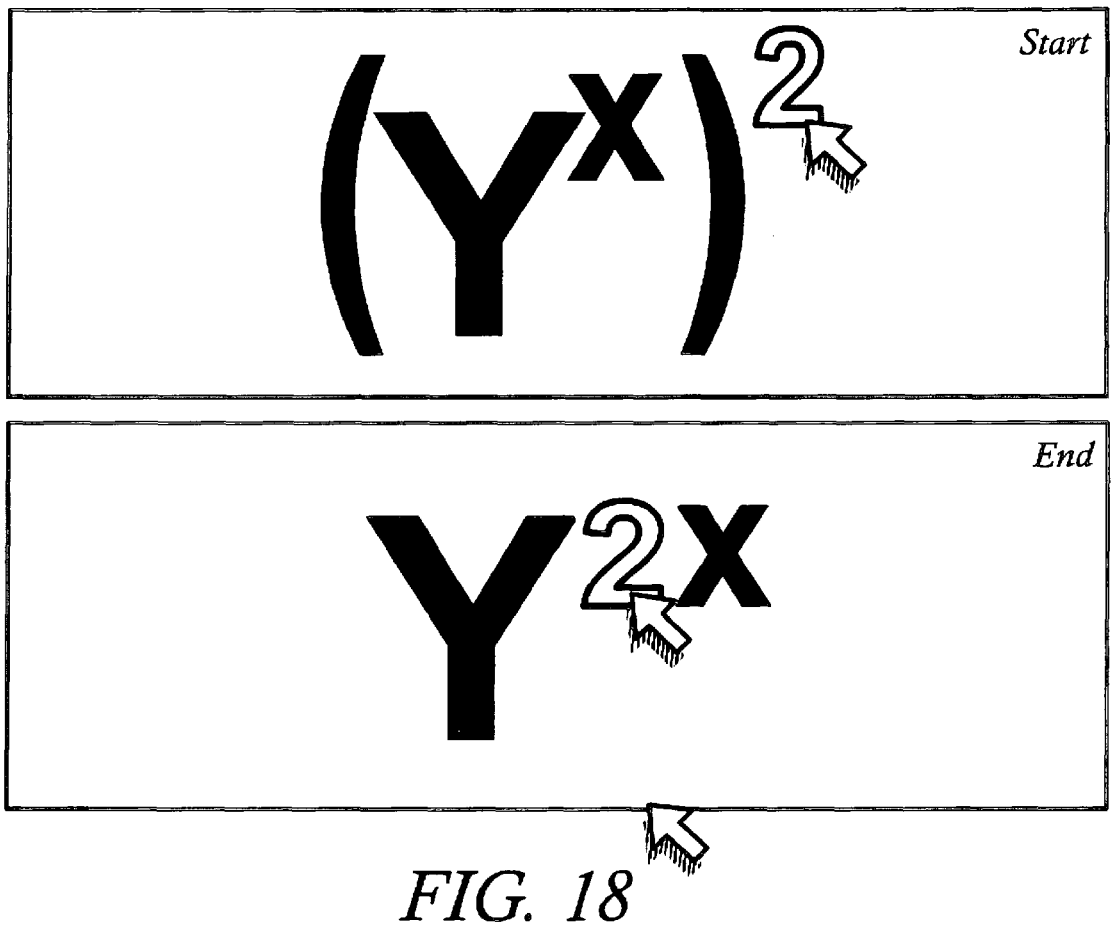
FIG. 18 illustrates the selection of an outermost of two exponents (125) and the behavior as it is dragged into the inner exponentiation.
Figure 19:
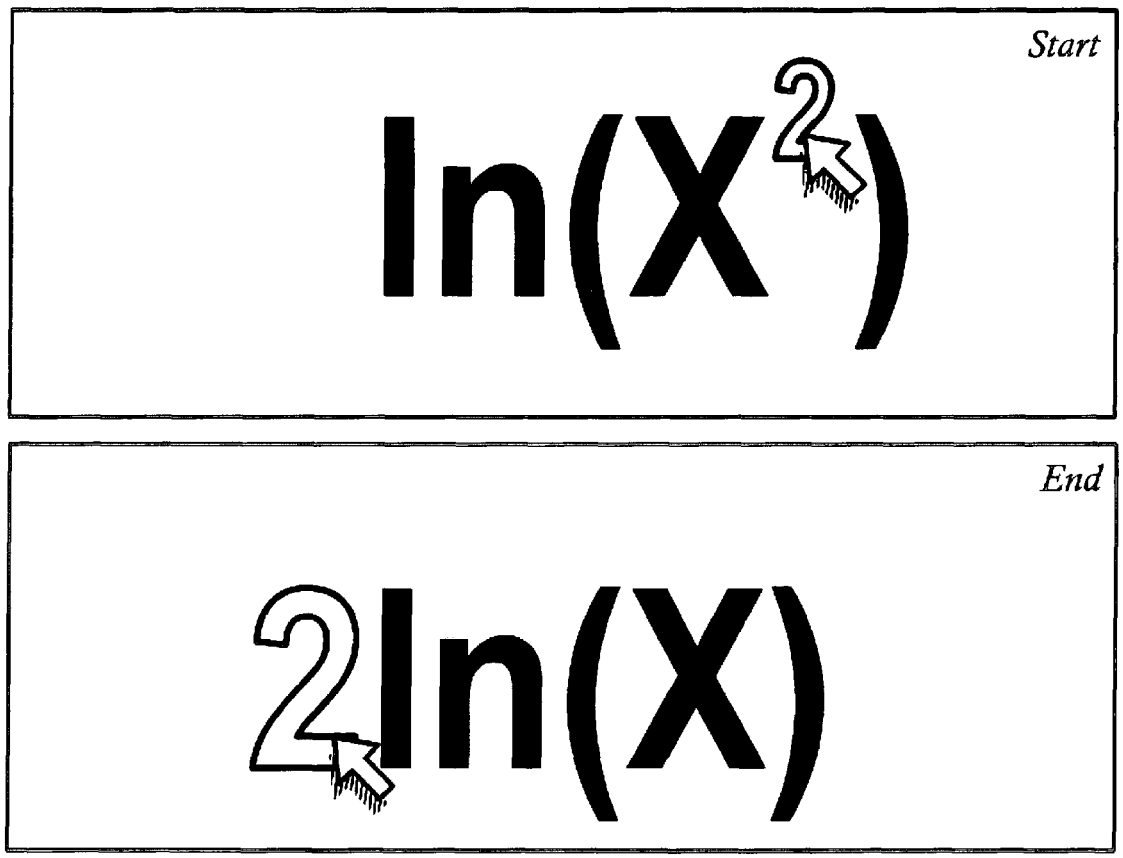
FIG. 19 shows the behavior of an equation with both logarithms and exponents.

These transformations are not limited to movement across a balanced equation, but also appear within a compound operands including exponents (FIG. 18) and logarithms (FIG. 19).

Figure 17:
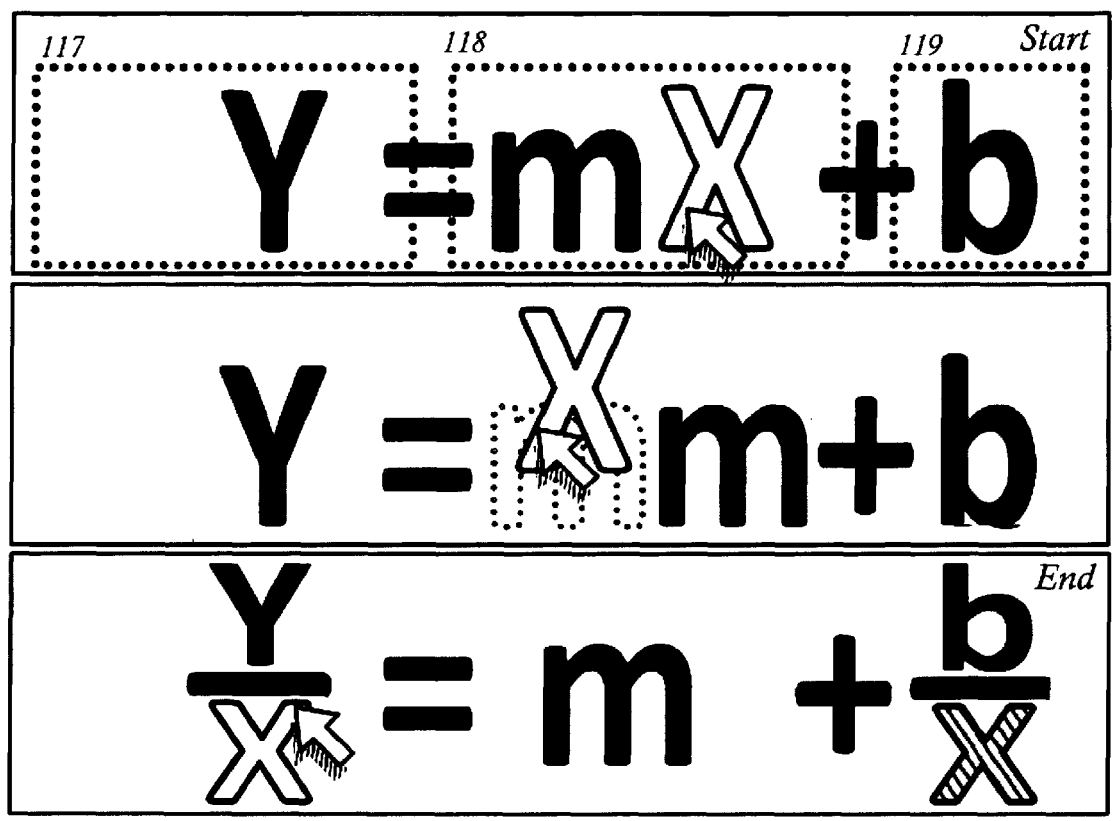
FIG. 17 shows the selection of a multiplicand (122) and the appearance of its associated regions. It illustrates the behavior of an embodiment without automatic term promotion.
Figure 20:
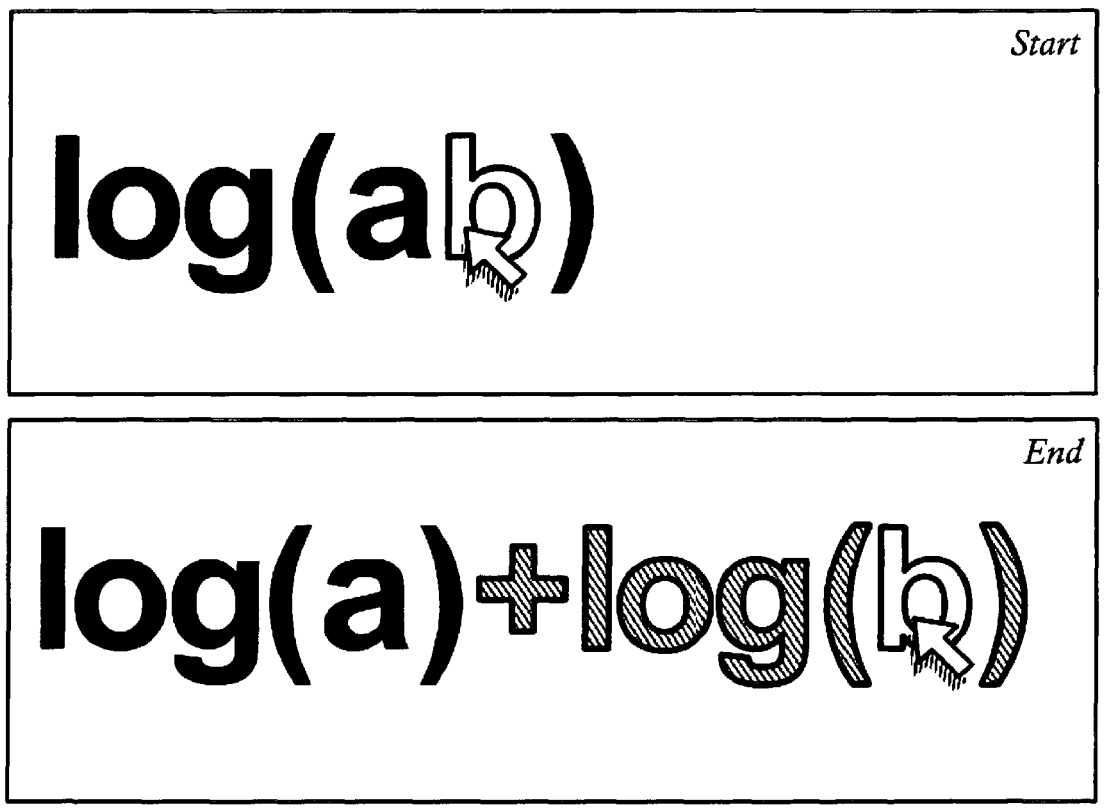
FIG. 20 shows the generation of a new logarithmic operator (126) as part of deconstruction of a term (127).
Figure 21:
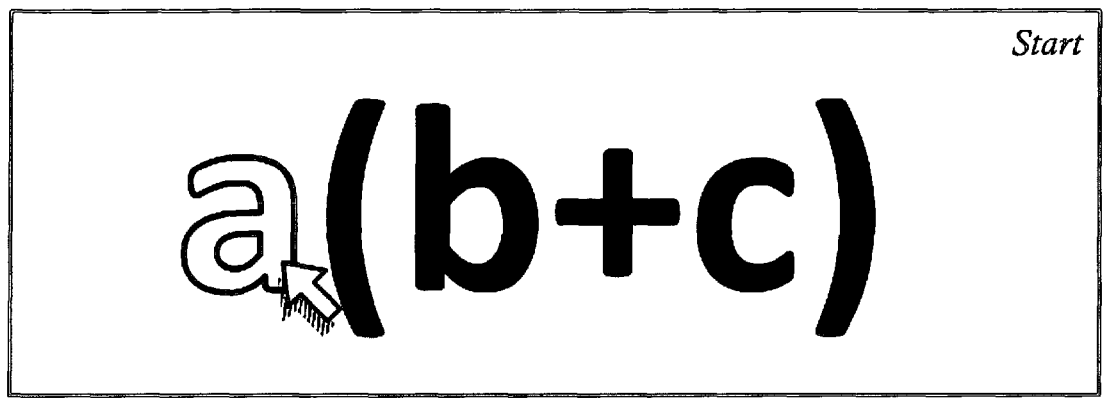
FIG. 21 shows the creation of a new term (128) during algebraic distribution.
Figure 21:
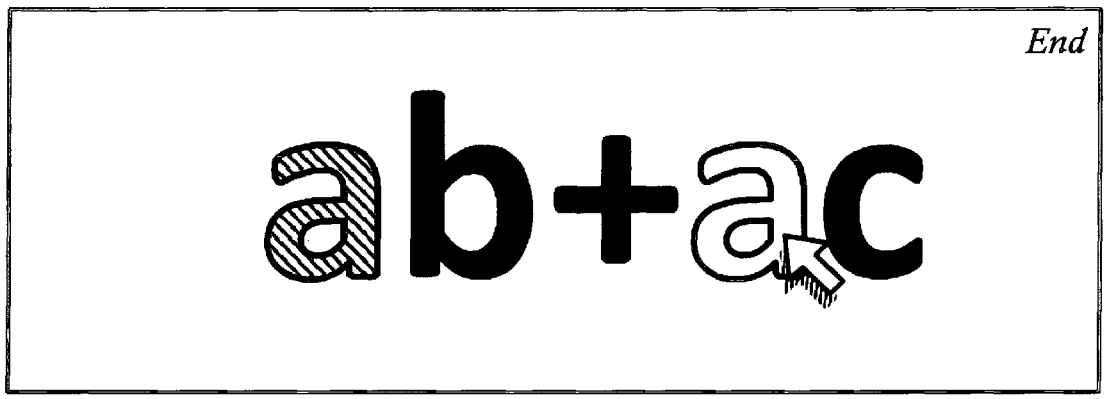
Figure 22:
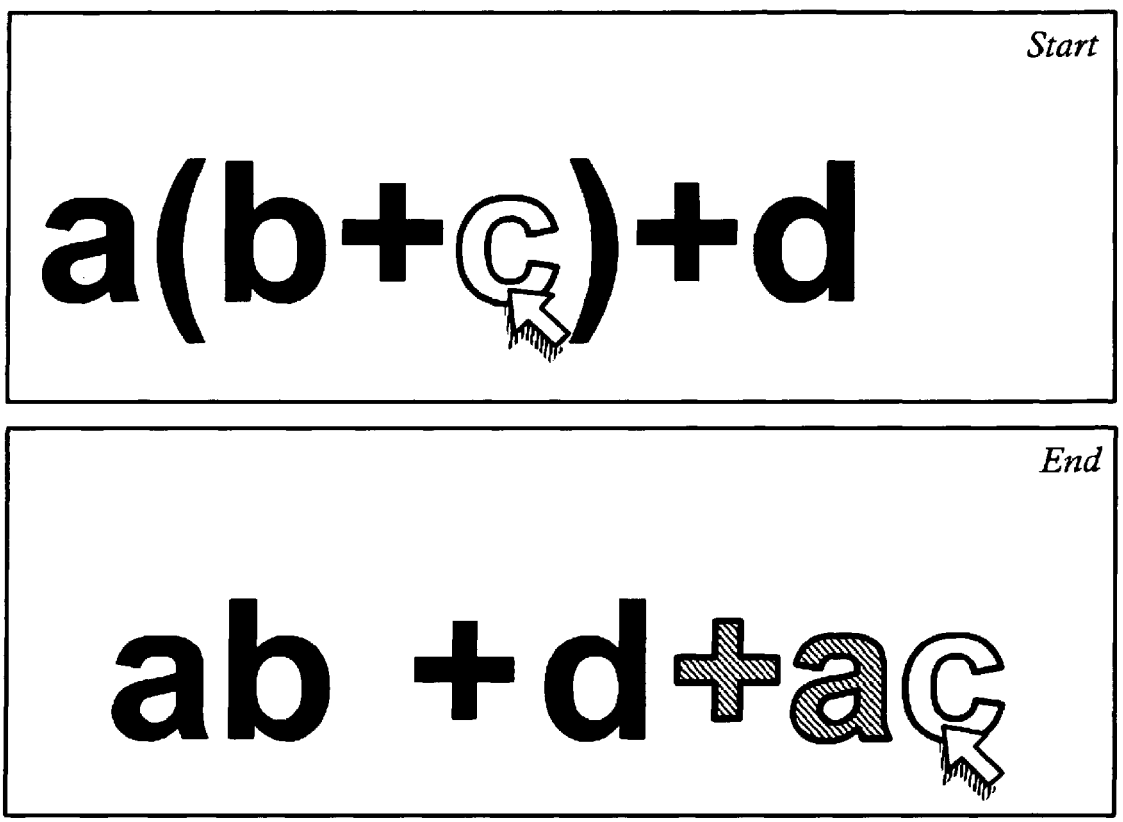
FIG. 22 shows single step distribution and commutation.
Figure 23:
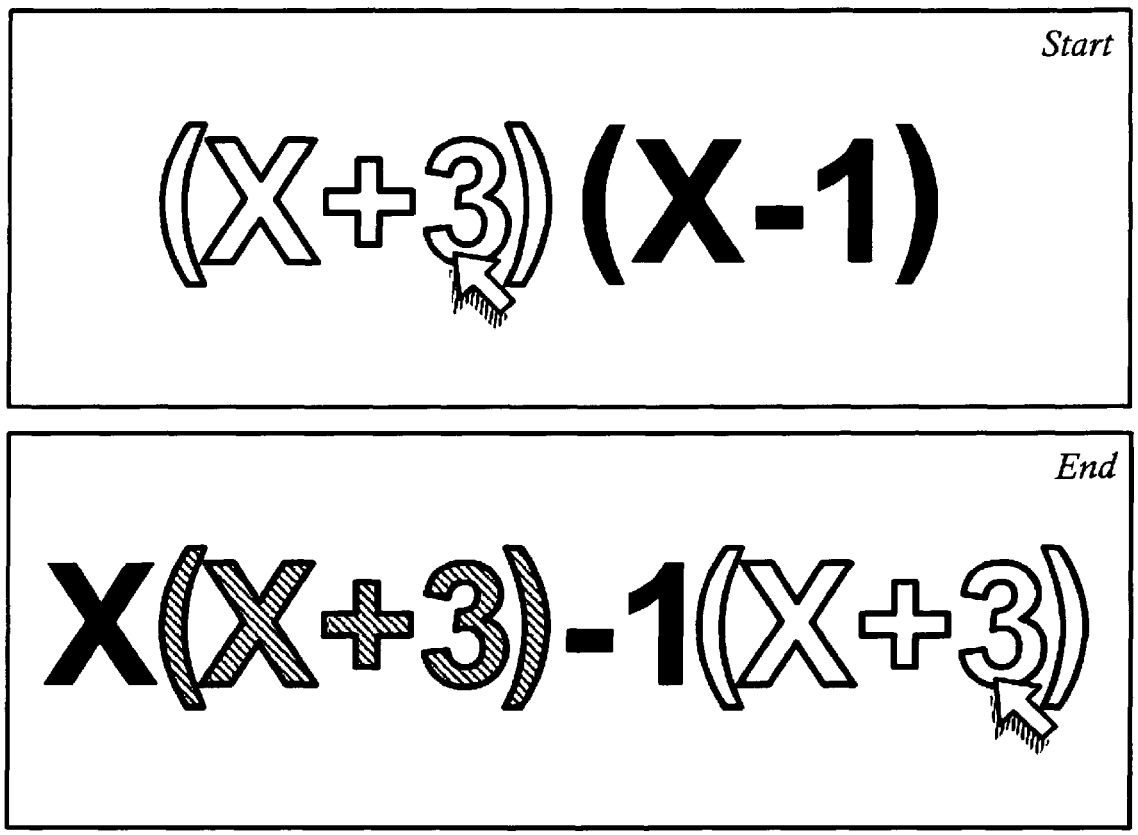
FIG. 23 shows the multiplication of two binomials.
Figure 24:
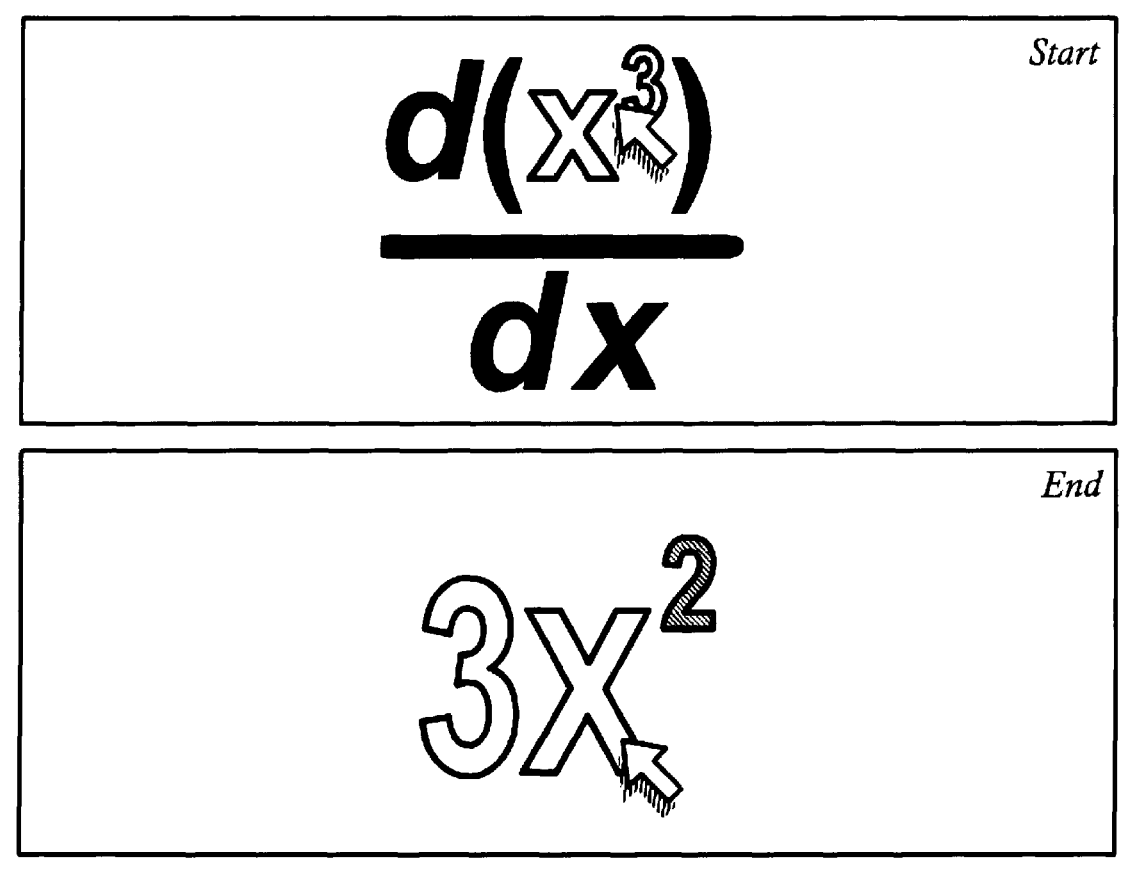
Figure 26:
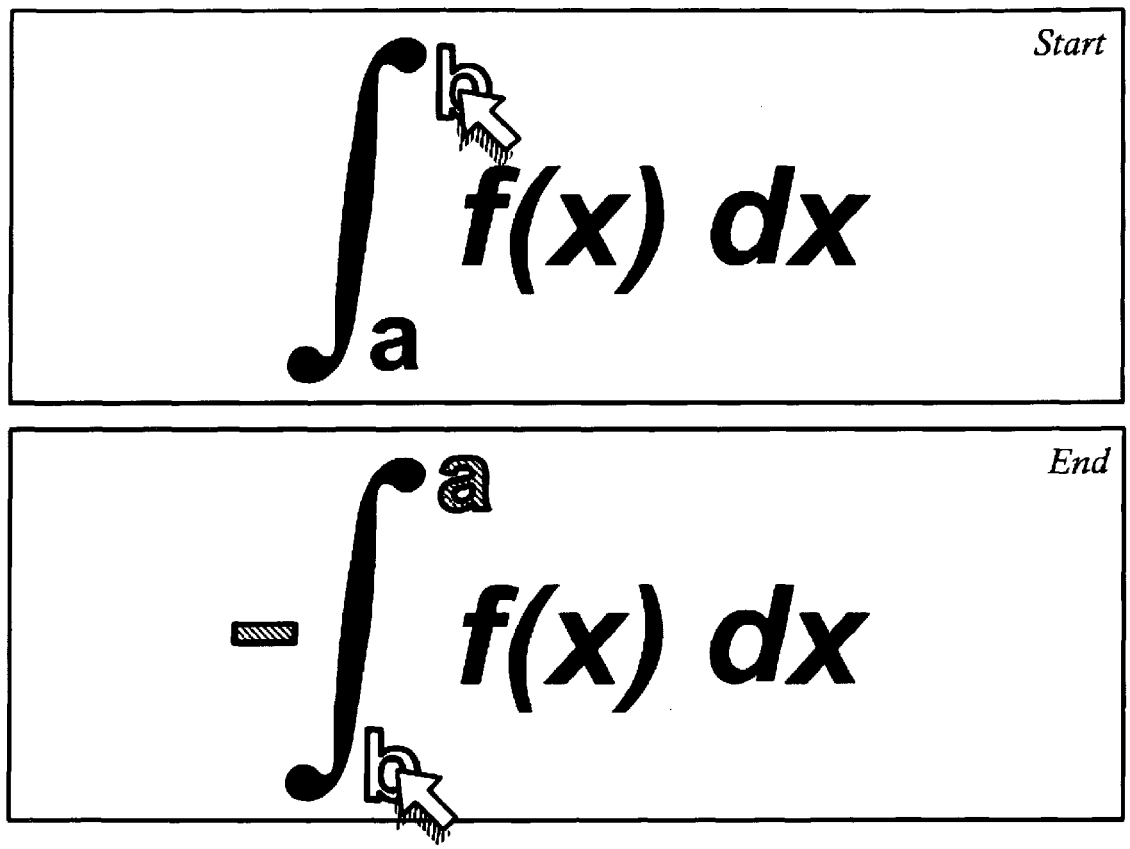
FIG. 26 shows an application in calculus. As the limits of the integral are reversed, a negation operator (131) emerges.

In some operations one or more new operand(s) may be also introduced. These operations include algebraic distribution (FIG. 21, 22), binomial multiplication (FIG. 23) and logarithmic decomposition (FIG. 20). In other operations (eg: factoring or differentiation (FIG. 24)) operands are combined or removed. Furthermore certain operations will change the number and content of relationships within the full expression(s) (FIG. 17, FIG. 25, FIG. 26).

Figure 28:
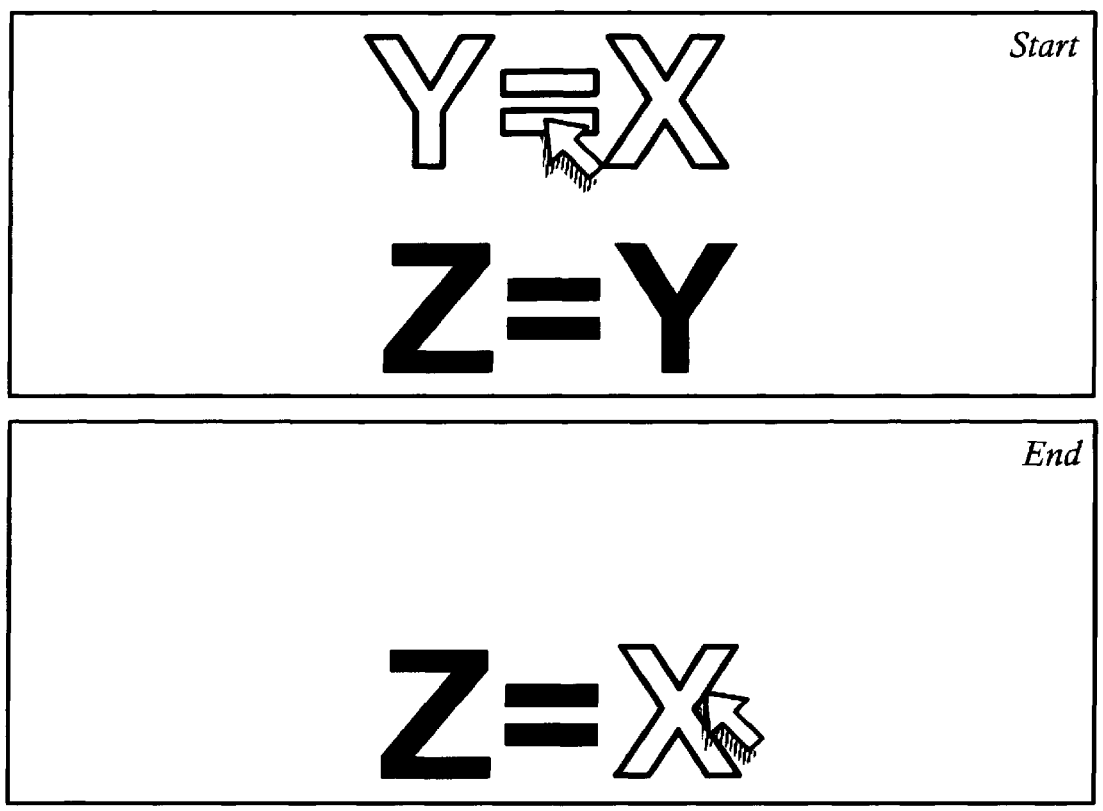
FIG. 28 shows substitution across a system of equations. One of the equations is selected by its relational operator (135) and dragged onto the term (136) it defines in a second equation.
Figure 29:
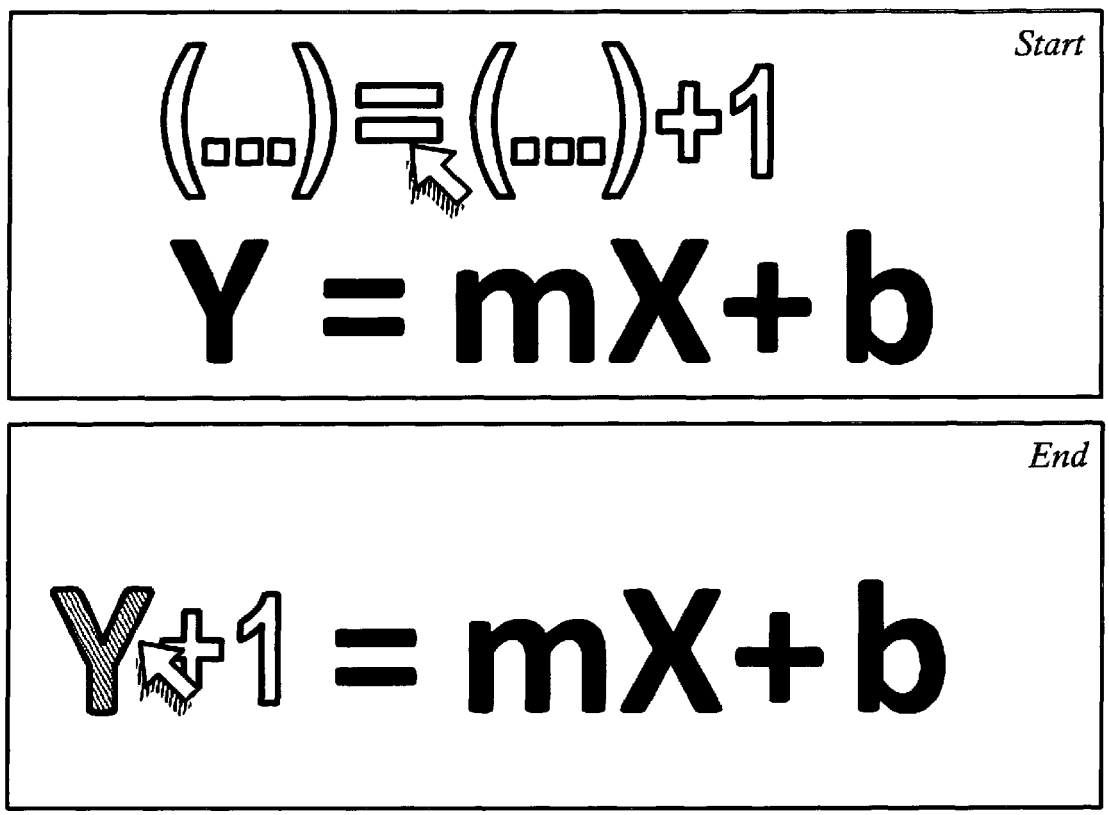
FIG. 29 illustrates a generic identity expression (138) and its subsequent use to introduce an identity (139) into a particular equation. Later this identity can be factored to allow more algebraic operations.

Solutions requiring systems of equations can be solved when one equation is simplified and becomes the moving term in operations on another equation (FIG. 28, 30). When combined with wild-card identity equations (FIG. 29), this offers the user the ability to introduce new terms into the working expression.

Figure 27:
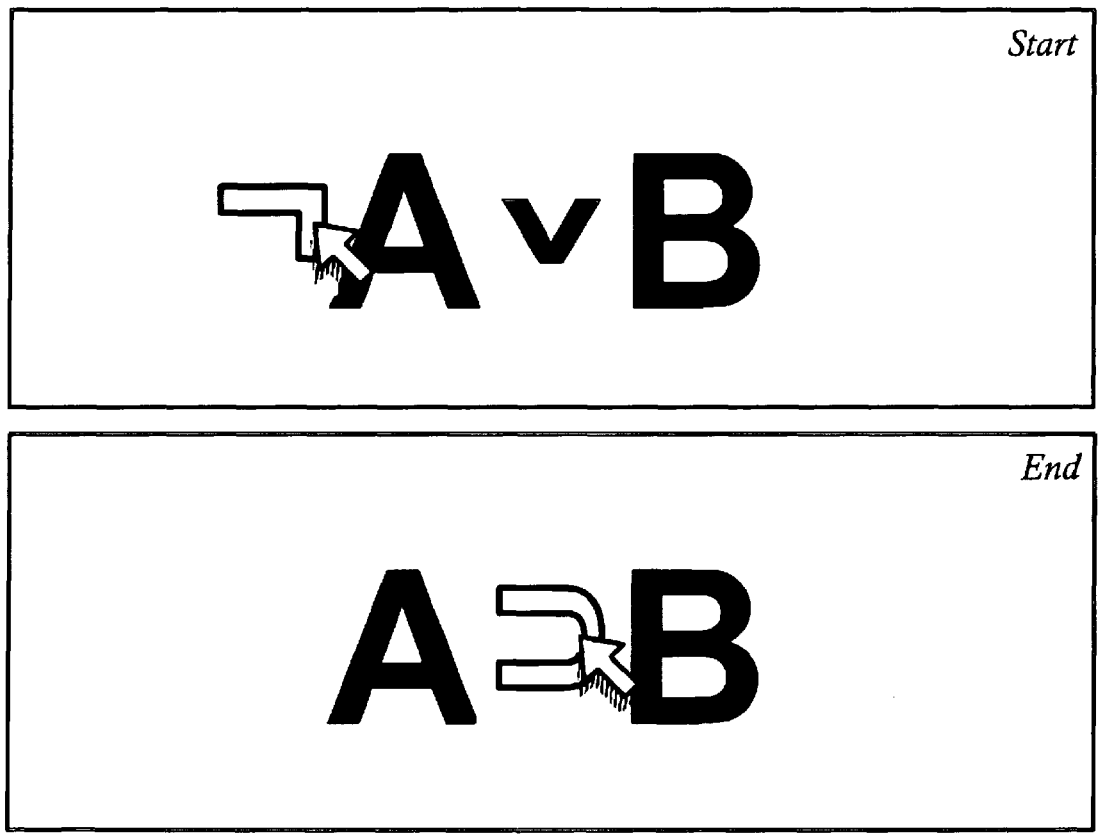
FIG. 27 shows an application in propositional logic where the operator NOT (132) is dragged onto the operator OR (133) creating the logical operator IMPLIES (134).
Figure 32:
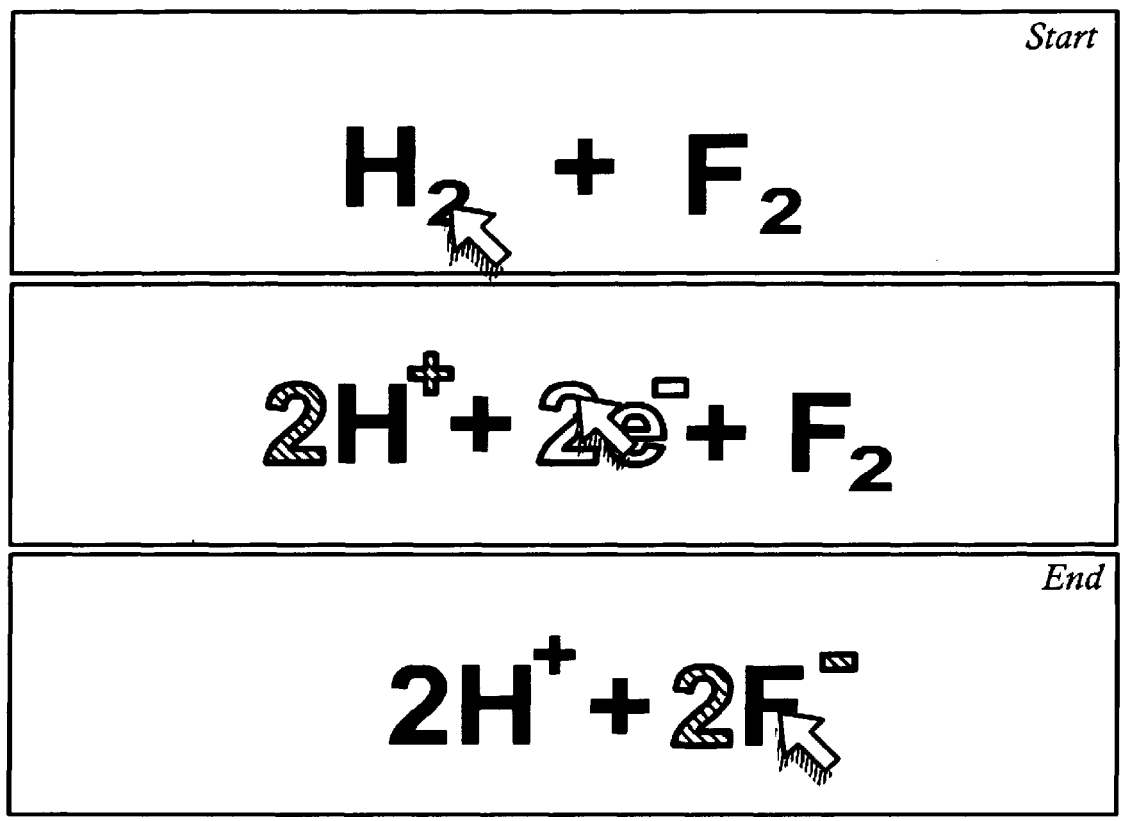
FIG. 32 shows application of this device and method to Chemistry. The manipulation of a simple redox algebra is illustrated. in the first phase, the user breaks a hydrogen molecule (140) into ions (141). In the second phase, the liberated electrons (142) are used to ionize fluorine (143).

Algebraic operations will vary across different logical disciplines. For example, in the manipulation of statements of propositional logic (FIG. 27), a naked operator may constitute a movable term. In a redox algebra for chemistry, dissolution of an atom might automatically imply ionization (FIG. 32).

(5) The user may optionally perform a confirmation step. For example, the user might signify acceptance of the altered algebraic expression by release, or deselection, of the symbol. The system's display will reflect this commitment by a change in the appearance of the expression and the relocated term.

The actions, steps, or sequence immediately above may be repeated once or more or may be repeated indefinitely: by the user, automatically, by several users in parallel or series, or any combination thereof.

While an exemplary embodiment of the invention may be implemented with an electronic digital computer system, other embodiments are anticipated in this invention.

Exemplary Details:

One skilled in the art of application development will be familiar with the elements that comprise any of the several embodiments of this invention.

Figure 33:
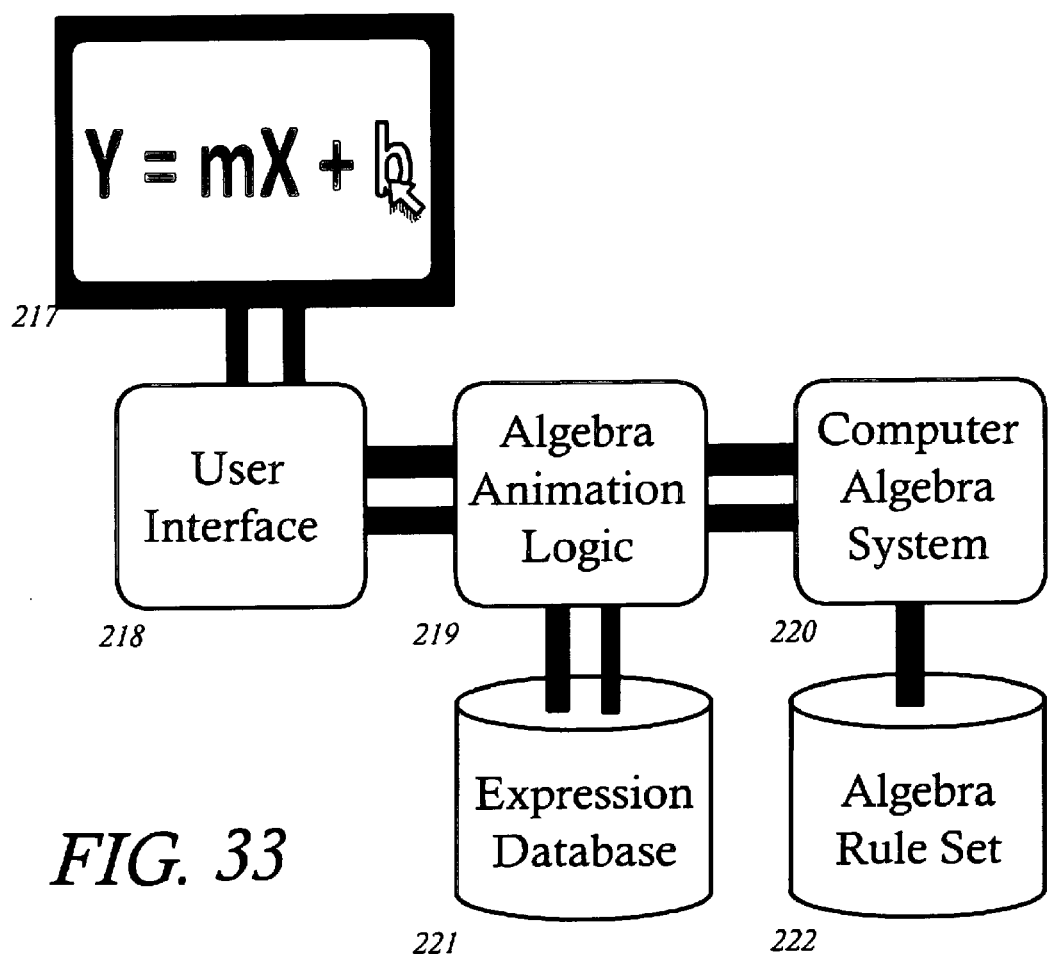
FIG. 33 demonstrates the components of a particular embodiment, where a touch screen (217) serves as both input and output device.

In FIG. 33, an exemplary embodiment is depicted. In this embodiment, a touch screen device (217) is employed which combines the two functions of display and user input capture. Other embodiments could employ two separate devices such as input capture through a mouse and display through a projector.

The computational resources of the invention include one or more processing units and the instruction store to support algorithmic operations. These resources support three related engines:

The User Interface (UI) (218) translates information between the internal abstractions and the visible, audible and tangible world of the user. Such systems are well known, and are often specialized for a particular computer system.

The Computer Algebra System (CAS) (220) may be of a well known design such as the several systems cited in above. Both User Interface and Computer Algebra Systems are well studied technologies and both are available in open source software.

The Algebra Animation Logic (AAL) (219) is constructed using standard software development tools, to perform the actions described below. It serves as a bridge between the UI and the CAS.

In a simple exemplary embodiment these may share a single central processing unit and the associated instruction store. More common embodiments would employ several central processing units and an array of graphic processing units within a single hand-held, portable or desktop computer. In such an embodiment, much of the User Interface (218) would reside in the graphic processing units white the Algebra Animation Logic (219) and the Computer Algebra System (220) would share the multiple central processing units as directed by the computer operating system. A third class of embodiment could employ a distributed processing architecture in which the three engines are located in multiple computers and communicate across a network.

The memory resources of the computer store the Expression Database (221) and Algebra Rule Set (222). Many embodiments are possible and each has its particular advantages. The Algebra Rule Set can reside in read-only memory such as an optical disk or semiconductor memory. In a simple embodiment, the Rule Set is embedded in the Computer Algebra System itself either as a block of embedded data or as rules distributed in the algorithms themselves. Such a design is viable in a single purpose embodiment. More flexible devices might keep one or more Algebra Rule Sets in the computing system's ready file system which may include optical, magnetic, semiconductor, and remotely located memory resources. This same file system will serve the purpose of Expression Database. Embodiments with no persistent memory devoted to an expression database are perfectly functional as well. The invention needs to only store one expression during actual operation.

Figure 35:
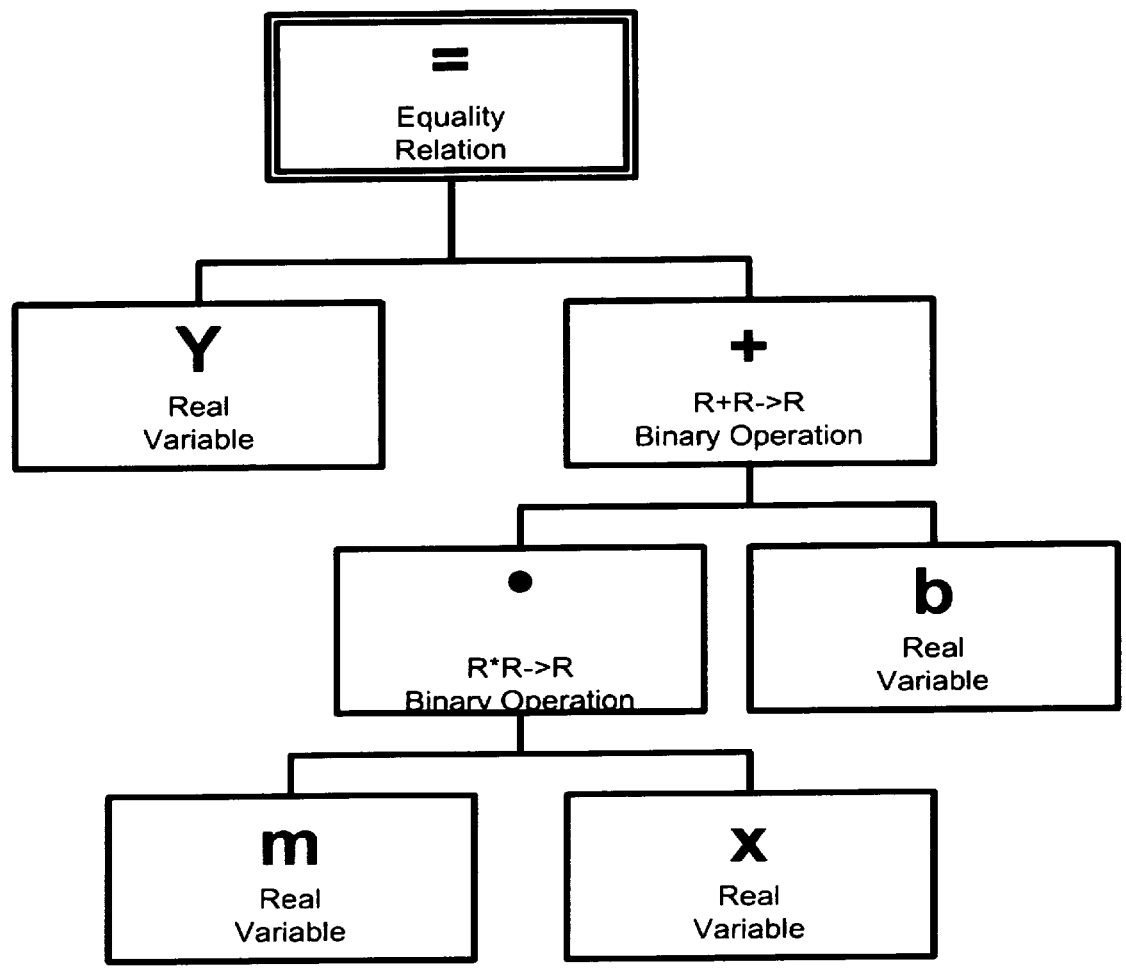
FIG. 35 illustrates the nodal structure of the expression Y=mX+b. In an exemplary embodiment, this representation is used by the computer algebra system, internally and in communication with other components.

Operation of Exemplary Details:

Operation of the embodiment shown in FIG. 33, might begin with the user's selection of an expression from the Expression Database (219). Such expressions will be stored in a functional data format, such as the standard Content MathML. The Computer Algebra System will compose a memory image of each expression that makes clear its functionality. In a preferred embodiment, this will take the form of a nodal structure (FIG. 35).

Employing well known methods of mathematic layout, such as taught by Razdow, the Algebra Animation Logic (ML) (220) will compose representations of available expressions to be rendered by the User Interface (UI) (219).

As the user begins to manipulate the expression, the ML identifies the movable terms from the nodal structure of the expression as maintained by the Computer Algebra System. These movable terms can be indicated to the user by the UI. In a touch screen embodiment, these may be simply highlighted. In a mouse-driven embodiment, these may be identified by their response to cursor rollover.

The UI, when it detects the selection of a term, highlights the term and moves its location as indicated by the user. The UI informs the ML of the selection. The ML traverses the nodal representation of the expression. Querying the CAS, which in turn consults the active Algebra Rule Set, the ML lists the potential loci to which the term can be moved. The ML constructs a target area around each potential locus. These targets are frequently nested to allow a term to be placed at different loci at different depths of a compound expression.

When crossing between certain nodes of the expression structure, the moving term will itself be altered. For example, when crossing between the two sides of an equation, a multiplicand will become its reciprocal. The ML establishes target regions around the graphic representation of these nodes as well. (FIG. 9)

Figure 34:
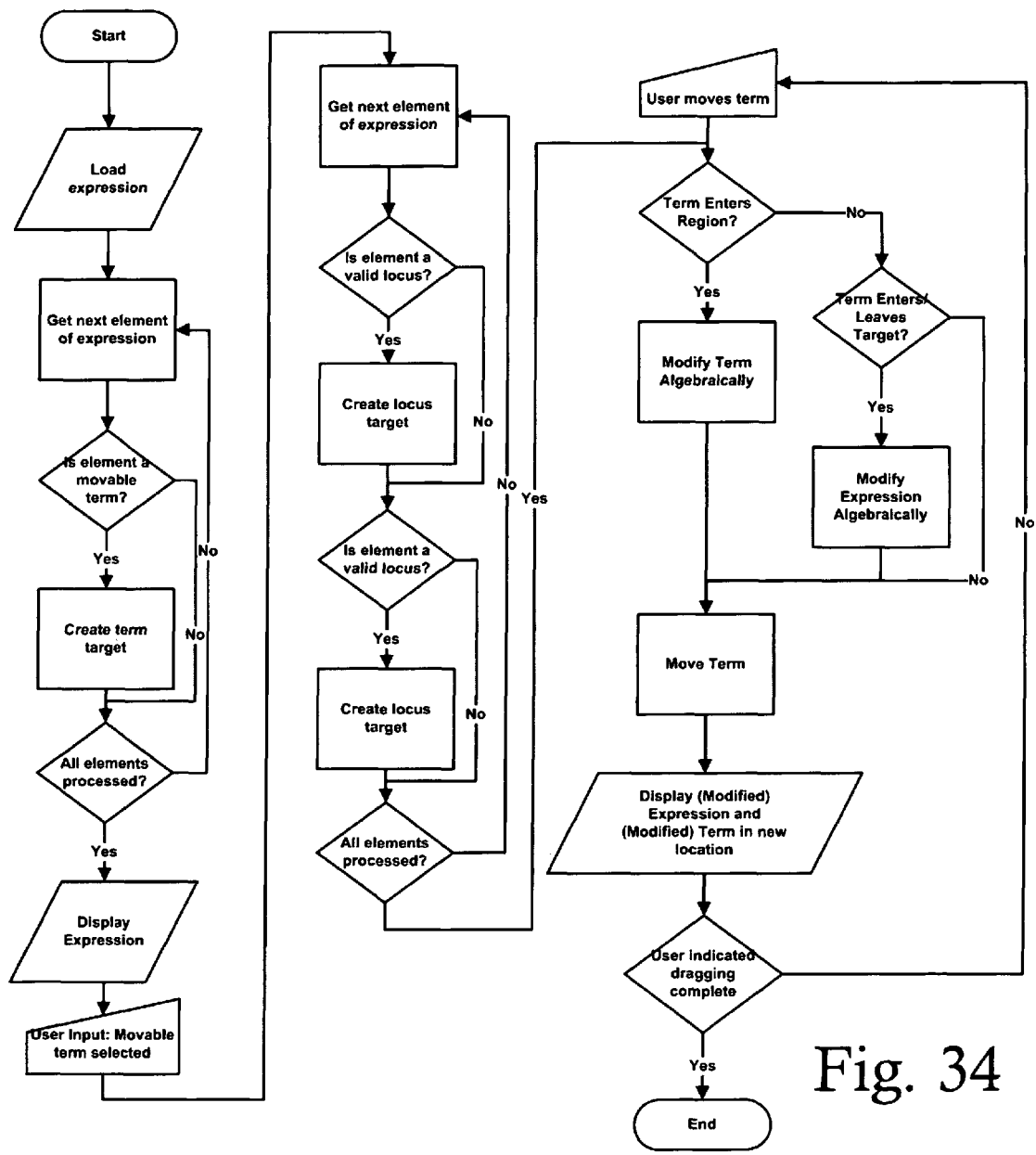
FIG. 34 is the flow chart for the software in one embodiment of the invention.
Figure 36:
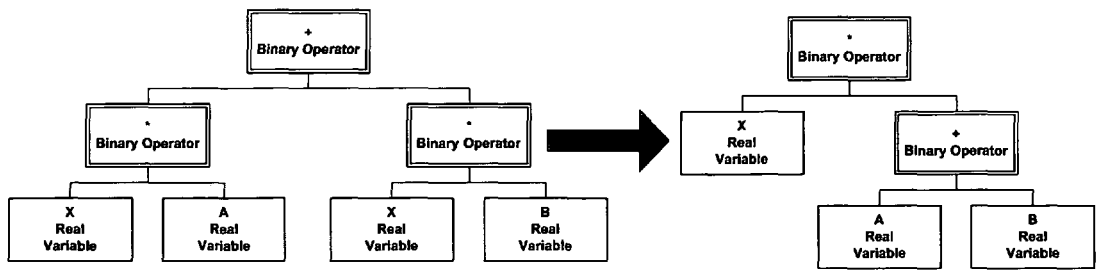
FIG. 36 illustrates the internal nodal structure of an expression as it changes during algebraic factoring.
Figure 37:
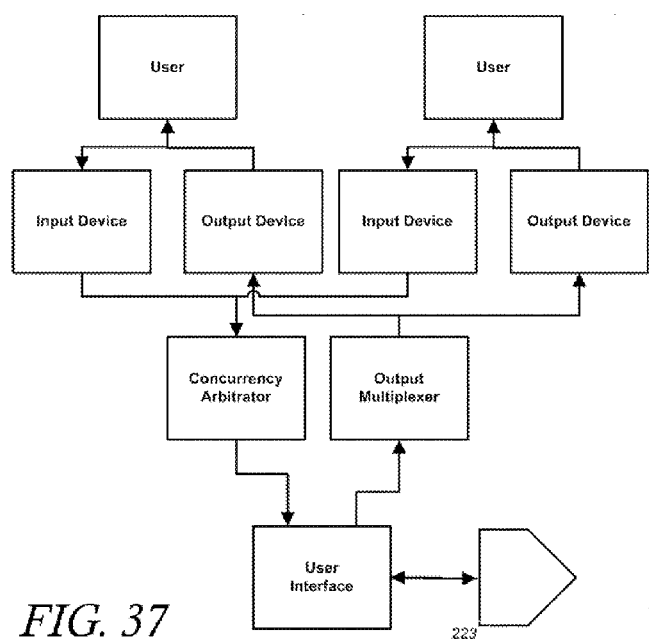
FIG. 37 illustrates a block diagram of a multi-user embodiment of the user interface, which connects to a standard embodiment of the remainder of the system (223) as seen in FIG. 34.
Figure 38:
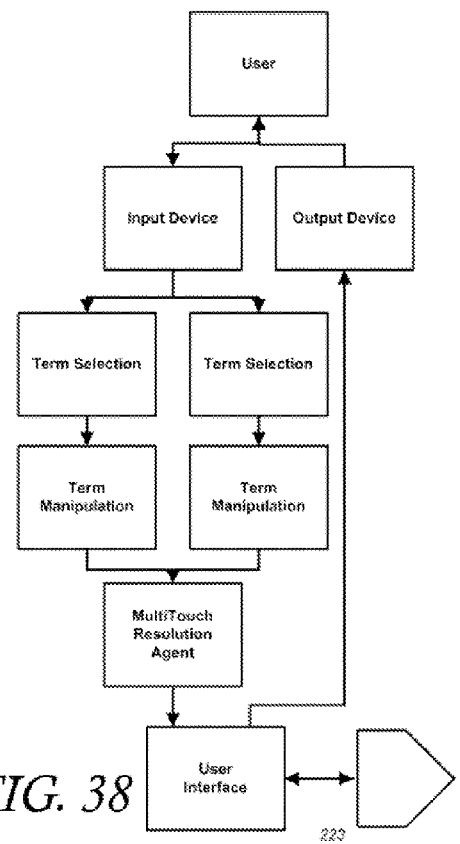
FIG. 38 illustrates a block diagram of an embodiment of the multi-touch user interface.

The UI may indicate the potential loci as it did the potential terms, such as by highlighting, or by response to proximity of the cursor. When the moving term enters a target area, the UI informs the ML. The ML employs the CAS to determine the new expression. (FIG. 36) This may require a change to the moving term, to the rest of the expression or to both. The ML manages the UI to insure that changes in the expression are clearly visible to the user. A formal flowchart of this embodiment is provided by FIG. 34.

New Utility

An important feature of this invention is the simplification of certain operations. Algebra students frequently execute each step of an algebra problem by performing the same operation to both sides of an equation. With this invention, they can execute the same step more quickly, by directly moving a term. The moving term may invert its value when it crosses an equal sign, an inequality or a division bar.

For example, in elementary polynomial algebra, moving an addend across the equal sign will generally invert the sign of the addend, changing addition to subtraction, or the reverse. Similarly, moving a multiplicand or an exponent across the equal sign will effectively change the term to its reciprocal. These operations may have the same result as the traditional methods of balancing an equation, but do so in a single step in direct response to the translocation of the term by the user.

1. When processing symbols within a complex operand in isolation, the system maintains equivalence as the user manipulates its elements.
   $X-Y$ can be transformed to $-Y+X$ by relocating Y
2. When processing relationships, the system can manipulate either side of the statement to maintain its truth.
   $X>Y$ can be transformed to $X-Y>0$ by relocating Y
3. When working with a system of relationships, the device can transfer operands between relationships to work toward a solution.
   If $Y=X$, then $Z=Y$ can be transformed to $Z=X$ by dragging either $=$
4. Similar work can be performed with inequalities as well as equalities.
   If $Y<X$, then $X<Z$ can be transformed to $Y<Z$
5. In a system of relationships, the device can substitute compound operands for simple ones, and visa versa.

If Y=4X+a, then Z=Y+b can be transformed to Z=4X+a+b

6. When working with a system of relationships, the device may generate new relationships and new relationship operators.

If Y<=X, and X<=Y then Y=X can be generated

Automatic introduction, substitution and deletion of operators by this device and methods of use thereof may be governed by the laws of the symbolic system being represented and driven by the actions of the user.

Figure 30:
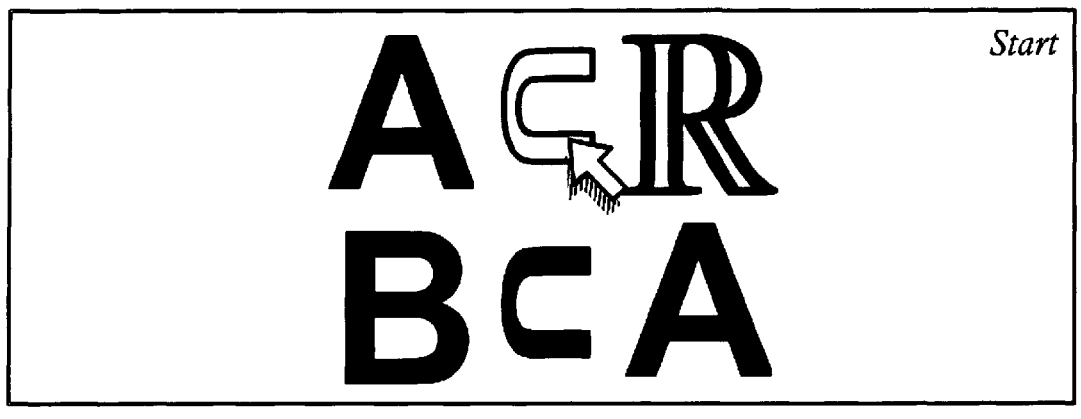
FIG. 30 demonstrates substitution in set theory.
Figure 30:
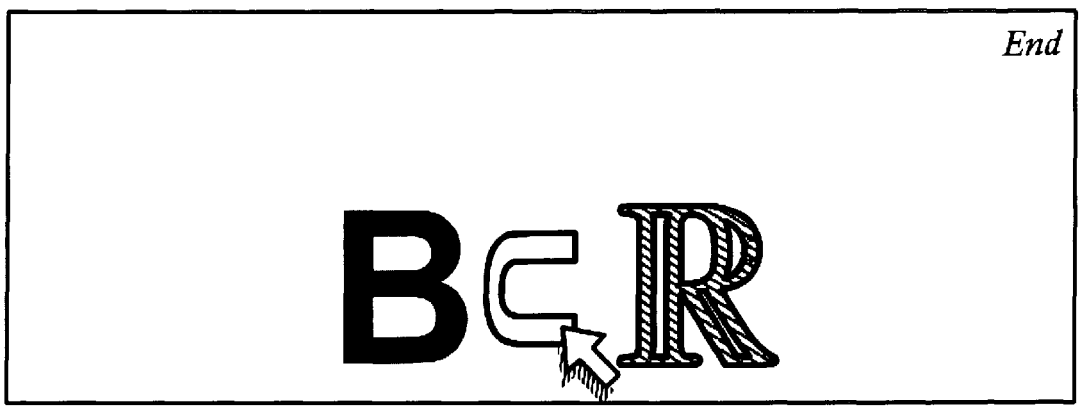

The symbolic grammars over which this device and methods of use may function include (but are not limited to) the basic algebra of polynomial equations, as well as the entire spectrum of symbolic mathematics, including calculus (FIG. 24, 25), set theory (FIG. 30), and propositional logic (FIG. 27) among many others. It may be also applicable to other symbolic algebras well outside pure mathematics, such as the equations of chemical equilibria (FIG. 32) and others. For example, it would be useful for calculating redox reactions, such as:

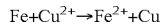

$$Fe + Cu^{2+} \rightarrow Fe^{2+} + Cu$$

In such use, operands may include representations of atoms and subatomic particles, and operators may represent ionization. A relational operator may include additional information, such as an asymmetric thermal transformation which may or may not be reversible.

Many input devices are appropriate to this system, including ones not yet known. The various sensors which now are used to acquire signals from a user include mouse, joystick, touch screen, game controller, tablet, keypad, touchpad, joypad, footpad, motion sensor, force board, body sensor, camera, brain monitor, speech control, and many others.

Many output devices are appropriate to the system, including ones not yet known. Such devices include, without limitation, visual displays based on cathode rays, light emitting diodes, liquid crystals, plasma, micro-mirror projection, electronic ink, holographic projection, reconfigurable keyboards, tactile screens based on Braille, audio interfaces including formant, concatenative or synthetic speech, and direct neural stimulation.

An embodiment of this device may consist purely of software that directs the performance of a user's general computing hardware.

An embodiment of the device may implement the operational rules of a single symbolic system, such as simple polynomial algebra. Another embodiment might contain the logic to perform operations in a plurality of systems, such as elementary algebra and inorganic chemistry. A third embodiment might include a feature that reads a formal rule set, and can perform operations in any system which is described using this formal grammar. Students may use a device or method according to the invention to learn algebra and other disciplines. Engineers and other technicians may use a device or method according to the invention to solve practical symbolic problems, just as a calculator is used to solve arithmetic problems. Other uses are myriad.

Users of the device or method according to the invention can employ common algebraic strategies including (but not limited to) simplification, extraction of roots, solving for one quantity in terms of another, and/or substitution of terms through a system of equations as well as other methods and processes. The device or method according to the invention may allow such symbolic operations to be performed more quickly, and/or with fewer errors, and/or less training than manual methods.

GENERALIZATION

The exemplary embodiments of the present inventions were chosen and described above in order to explain the principles of the invention and their practical applications so as to enable others skilled in the art to utilize the inventions including various embodiments and various modifications as are suited to the particular uses contemplated. The examples provided herein are not intended as limitations of the present invention. Other embodiments will suggest themselves to those skilled in the art. Therefore, the scope of the present invention is to be limited only by the claims below.

We claim:

1. A method of generating an expression of algebra consistent with an existing expression on an output means, comprising:
   a. providing a memory which is able to store said existing expression in said memory,
   b. providing an output means which is operatively connected to said memory for displaying said expression stored in said memory,
   c. providing an input means which a human operator can use to select one or more terms within said expression displayed by said output,
   d. providing an input means which a human operator can use to maneuver said selected term or terms to one or more loci,
   e. providing a computer algebra system operatively connected to said memory for manipulating said existing expression stored in said memory,
   f. providing an object program which will:
      i. load an expression into said memory, and
      ii. display said expression on said output means, and
      iii. register a human operator's selection of one or more terms within said expression via said input means, and
      iv. display on said output means a representation of the currently selected term as said human operator manipulates said currently selected term, and v. respond to said human operator using said input means to interact with said loci and thus drive said computer algebra system to create a modified version of said expression in said memory, and
      vi. display said modified expression on said output means as the result of an edit-in-place operation, and
      vii. repeat steps iv through vi until said human operator signals via the input means that the manipulation is complete,
   whereby said output means will display said modified expression in the place of said existing expression, and a human operator can manipulate an electronic representation of an algebraic expression.

2. The method of claim 1 where said object program performs a plurality of manipulations simultaneously upon the same expression,
   whereby multiple manipulations can be performed concurrently, allowing said human operator to work more efficiently.

3. The method of claim 2 where said plurality of manipulations are used to disambiguate valid transformations determined by the computer algebra system,
   whereby multiple manipulations imply the disambiguation of one or more of said operations, and said human operator can more intuitively direct the computer algebra system which of several valid transformations was desired.

4. The method of claim 2 where a plurality of human operators executes said plurality of manipulations, whereby multiple human operators perform manipulations concurrently, allowing a plurality of humans to cooperate in the transformation of an algebraic transformation.

5. The method of claim 1, where the domain of said computer algebra system is drawn from the field of mathematics.

6. The method of claim 1, where the term manipulated by the computer algebra system is a compound operand which is comprised of:
   a. said term selected by said input means,
   b. at least one other operator or operand,
   whereby said selected term is modified by the computer algebra system, allowing for a human operator to exert control in a more fluid and natural manner.

7. The method of claim 1, where said object program responds to movement of said representation of said selected term from one region into another region by modifying said representation to a representation of said selected term transformed in the same manner said term would be transformed if used by said computer algebra system as driven by a locus in said region,
   whereby said selected term is modified as the term is manipulated into regions, allowing the human operator to manipulate said selected term prior to using a locus to manipulate said expression.

8. A machine for generating an expression of algebra consistent with an existing expression on an output means, comprising:
   a. a memory which is able to store said existing expression in said memory,
   b. an output means which is operatively connected to said memory for displaying said expression stored in said memory,
   c. an input means which a human operator can use to select one or more terms within said expression displayed by said output,
   d. an input means which a human operator can use to maneuver said selected term or terms to one or more loci,
   e. a computer algebra system operatively connected to said memory for manipulating said existing expression stored in said memory,
   f. an object program which will:
      i. load an expression into said memory, and
      ii. display said expression on said output means, and
      iii. register a human operator's selection of one or more terms within said expression via said input means, and
      iv. display on said output means a representation of the currently selected term as said human operator manipulates said currently selected term, and
      v. respond to said human operator using said input means to interact with said loci and thus drive said computer algebra system to create a modified version of said expression, in said memory, and
      vi. display said modified expression on said output means as the result of an edit-in-place operation, and
      vii. repeat steps iv through vi until said human operator signals via the input means that the manipulation is complete,
   whereby said output means will display said modified expression in the place of said existing expression, and a human operator can manipulate an electronic representation of an algebraic expression.

9. The method of claim 8 where said object program performs a plurality of manipulations simultaneously upon the same expression, whereby multiple manipulations can be performed concurrently, allowing said human operator to work more efficiently.

10. The method of claim 9 where said plurality of manipulations are used to disambiguate valid transformations determined by the computer algebra system, whereby multiple manipulations imply the disambiguation of one or more of said operations, and said human operator can more intuitively direct the computer algebra system which of several valid transformations was desired.

11. The method of claim 9 where a plurality of human operators executes said plurality of manipulations,
   whereby multiple human operators perform manipulations concurrently, allowing a plurality of humans to cooperate in the transformation of an algebraic transformation.

12. The method of claim 8, where the domain of said computer algebra system is drawn from the field of mathematics.

13. The method of claim 8, where the term manipulated by the computer algebra system is a compound operand which is comprised of:
   a. said term selected by said input means,
   b. at least one other operator or operand,
   whereby said selected term is modified by the computer algebra system, allowing for a human operator to exert control in a more fluid and natural manner.

14. The method of claim 8, where said object program responds to movement of said representation of said selected term from one region into another region by modifying said representation to a representation of said selected term transformed in the same manner said term would be transformed if used by said computer algebra system as driven by a locus in said region,
   whereby said selected term is modified as the term is manipulated into regions, allowing the human operator to manipulate said selected term prior to using a locus to manipulate said expression.

* * * * *